United States Patent
Hwang et al.

(10) Patent No.: US 11,892,122 B2
(45) Date of Patent: Feb. 6, 2024

(54) VIBRATION-PROOF HANGER

(71) Applicants: Sunbeom Hwang, Seoul (KR);
Yeong-eun Hwang, Seoul (KR)

(72) Inventors: Sunbeom Hwang, Seoul (KR);
Yeong-eun Hwang, Seoul (KR)

(73) Assignees: Sunbeom Hwang, Seoul (KR);
Yeong-eun Hwang, Seoul (KR)

( * ) Notice: Subject to any disclaimer, the term of this patent is extended or adjusted under 35 U.S.C. 154(b) by 112 days.

(21) Appl. No.: 17/486,016

(22) Filed: Sep. 27, 2021

(65) Prior Publication Data

US 2023/0095802 A1  Mar. 30, 2023

(51) Int. Cl.
| F16M 13/02 | (2006.01) |
| F16F 15/02 | (2006.01) |
| F16M 11/38 | (2006.01) |
| F16M 11/10 | (2006.01) |

(52) U.S. Cl.
CPC ......... *F16M 13/022* (2013.01); *F16F 15/022* (2013.01); *F16M 11/10* (2013.01); *F16M 11/38* (2013.01); *F16F 2228/066* (2013.01); *F16F 2230/0047* (2013.01)

(58) Field of Classification Search
CPC ...... F16M 13/022; F16M 11/10; F16M 11/38; F16M 11/04; F16F 15/022; F16F 2228/066; F16F 2230/0047
See application file for complete search history.

(56) References Cited

U.S. PATENT DOCUMENTS

| 4,208,028 | A | * | 6/1980 | Brown | G03B 13/00 |
|  |  |  |  |  | 396/421 |
| 6,012,693 | A | * | 1/2000 | Voeller | F16M 11/048 |
|  |  |  |  |  | 248/920 |
| 6,695,274 | B1 | * | 2/2004 | Chiu | F16M 11/24 |
|  |  |  |  |  | 248/371 |
| 7,252,277 | B2 | * | 8/2007 | Sweere | F16M 11/24 |
|  |  |  |  |  | 248/371 |
| 7,726,616 | B2 | * | 6/2010 | Zhang | F16M 11/2021 |
|  |  |  |  |  | 248/920 |
| 8,011,632 | B2 | * | 9/2011 | Wang | F16M 11/10 |
|  |  |  |  |  | 248/920 |
| 8,317,152 | B1 | * | 11/2012 | Zhou | F16M 13/00 |
|  |  |  |  |  | 248/397 |
| 8,342,467 | B2 | * | 1/2013 | Stachowski | F16M 13/02 |
|  |  |  |  |  | 248/281.11 |

(Continued)

FOREIGN PATENT DOCUMENTS

| JP | 2016-049962 A | 4/2016 |
| KR | 10-1832935 B1 | 2/2018 |
| KR | 10-1838453 B1 | 4/2018 |

*Primary Examiner* — Monica E Millner
(74) *Attorney, Agent, or Firm* — NKL LAW; Jae Youn Kim

(57) ABSTRACT

Proposed is a vibration-proof hanger. According to one embodiment, the vibration-proof hanger includes a fitting bracket having a fixed plate configured to allow a first surface to be integrally fixed to an artificial structure, wherein a hinge unit is provided on a second surface of the fixed plate, a tilting arm unit configured to allow one end to be rotatably fixed to the hinge unit to be tilted, and a vibration-proof unit configured to be coupled to the tilting arm unit to absorb vibration transferred to the tilting arm unit or rotate to prevent vibration of the tilting arm unit.

16 Claims, 23 Drawing Sheets

(56) References Cited

U.S. PATENT DOCUMENTS

| | | | | |
|---|---|---|---|---|
| 8,931,748 | B2* | 1/2015 | Bowman | F16M 13/022 |
| | | | | 248/917 |
| 9,237,673 | B2* | 1/2016 | Tabata | F16M 11/10 |
| 11,118,729 | B2* | 9/2021 | Zebarjad | F16M 13/022 |
| 11,131,421 | B2* | 9/2021 | Hung | F16M 11/2021 |
| 11,435,026 | B2* | 9/2022 | Vlaar | F16M 11/2092 |
| 2004/0245419 | A1* | 12/2004 | Sweere | F16M 11/105 |
| | | | | 248/278.1 |
| 2014/0291457 | A1* | 10/2014 | Rotheisler | G03B 17/561 |
| | | | | 248/123.2 |
| 2014/0353453 | A1* | 12/2014 | Quijano | F16M 11/18 |
| | | | | 248/419 |
| 2020/0214441 | A1* | 7/2020 | Matlin | A47B 21/02 |

\* cited by examiner

VIBRATION-PROOF HANGER

BACKGROUND OF THE INVENTION

Field of the Invention

The present disclosure relates to a vibration-proof hanger and, more specifically, to a vibration-proof hanger configured to stably and efficiently support an object mounted on one side thereof while absorbing vibration.

Description of the Related Art

In general, an installation device for installing a mounted object such as a camera is a stand called a tripod, a crane equipped with a boom for mounting an object, or a cradle type hanger that is installed in the shape of a cantilever on an artificial structure (e.g., a wall, a ceiling, a column, etc.).

Here, in the case of the above-mentioned cradle-type hanger, it includes a boom installed in a horizontal state on the wall and a seat for mounting an object, such as a camera, thereon is installed at the end of the boom. Moreover, the boom usually includes a single rod and hinges mounted on both ends so that both ends are rotated around the hinges when necessary. In other words, the boom may be rotated around the hinges if necessary to form an inclination or a level. At this time, rotation of the boom is controlled manually by loosening and re-tightening screws fastened to the hinges or is automatically controlled by operation of a motor when the motor is installed in a hinge unit.

However, such a conventional cradle-type hanger has a problem in that it is inconvenient to operate the screws installed at both ends of the boom, respectively, and cannot be used in case of a motor failure. Since the boom includes a single rod, when external vibration is transferred to the artificial structure, the vibration is amplified by the length of the rod, thereby causing a problem in which a mounted object such as a camera shakes severely.

To solve such problems, the applicant of the present disclosure has applied for a patent for "CAMERA CRADLE" that can solve the above problems with the Korean Intellectual Property Office and has been registered (Patent No. 10-1832935) on Feb. 21, 2018. This prior art includes a fitting bracket fixed to a wall, an upper arm and a lower arm that allow both ends to be rotatably fixed to a mounting bracket on which a camera is mounted, respectively, and a tilting adjuster that provides the upper arm and the lower arm with a rotational force required for rotation of tilting to adjust a tilting angle, and thus the angle of the upper arm or lower arm can be easily adjusted through the tilting adjuster. Moreover, the upper arm and the lower arm are respectively installed on the upper part and the lower part of the fitting bracket and are configured to be prevented from easily moving during vibration, and thus the vibration of the artificial structure transferred to the upper arm and the lower arm can be suppressed as much as possible.

On the other hand, after the application of the above-mentioned prior art, the applicant of the present disclosure filed began to study again an improved technology that can further mitigate the vibration transferred from an artificial structure such as a wall, and as this improved technology is completed, the present disclosure has applied.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent Document 1) Korean Patent No. 10-1832935 (Hwang Won-sun, Feb. 28, 2018)

SUMMARY OF THE INVENTION

An objective of the present disclosure is to provide a vibration-proof hanger configured to stably and efficiently support a mounted object such as a camera or a measuring instrument while absorbing vibration and, more specifically, is to provide a vibration-proof hanger having a structure capable of maximally suppressing and mitigating vibration transferred to a fitting bracket or a tilting arm unit.

A vibration-proof hanger according to the present disclosure may include: a fitting bracket having a fixed plate configured to allow a first surface thereof to be integrally fixed to an artificial structure, wherein a hinge unit is provided on a second surface of the fixed plate; a tilting arm unit configured to allow one end to be rotatably fixed to the hinge unit to be tilted; and a vibration-proof unit configured to be coupled to the tilting arm unit to absorb vibration transferred to the tilting arm unit or rotate to prevent vibration of the tilting arm unit.

The vibration-proof unit may include at least one of an absorption-type vibration-proof module coupled to a central portion in the longitudinal direction of the tilting arm unit to absorb vibration of the tilting arm unit and a rotation-type vibration-proof module coupled to the tilting arm unit and provided rotatably.

The absorption-type vibration-proof module may include: an absorption-type vibration-proof module body; a vibration-proof elastic member provided inside the absorption-type vibration-proof module body and coupled in parallel to the longitudinal direction of the tilting arm unit to elastically support the tilting arm unit; and a coupling dial coupled through the absorption-type vibration-proof module body, the vibration-proof elastic member, and the tilting arm unit to adjust the thickness of the vibration-proof elastic member.

The absorption-type vibration-proof module may further include a thickness indication plate provided adjacent to or spaced apart from the absorption-type vibration-proof module body and provided with a first scale for indicating the thickness of the vibration-proof elastic member.

The coupling dial may include: a dial shaft penetrating the absorption-type vibration-proof module body, the vibration-proof elastic member, and the tilting arm unit; and a dial cap coupled to an end of the dial shaft and having a scale capable of checking the number of rotations.

The dial cap may have a second scale that is a scale of a unit less than that of the first scale.

The coupling dial may be a dual-type coupling dial provided in a dual manner to face the center line of the absorption-type vibration-proof module body.

The dial caps may be coupled respectively to one end of one of the dial shafts and the other end of the other to face each other at opposite positions.

The absorption-type vibration-proof module body may be configured in a number corresponding to the number of the dial shafts or the dial caps and may allow the dial shafts to penetrate the absorption-type vibration-proof module bodies, respectively.

The vibration-proof elastic member may be divided into a number corresponding to the number of the dial shafts to allow the dial shafts to penetrate the divided vibration-proof elastic members, respectively.

The rotation-type vibration-proof module may be provided in a dual manner to face both sides with respect to the tilting arm unit.

Each of the rotation-type vibration-proof module may include: a first vibration-proof ball joint coupled to one end of the fixed plate side of any one selected from the upper arm and the lower arm and including the first ball joint penetrating portion; a vibration-proof rod having one end connected to the first vibration-proof ball joint and disposed to cross the longitudinal directions of the upper arm and the lower arm; and a second vibration-proof ball joint connected to a second end of the vibration-proof rod and including a second ball joint penetrating portion.

The vibration-proof rod may include: a first rotation-type vibration-proof shaft having one end fixed to the first vibration-proof ball joint; a vibration-proof spring having one end coupled to the other end of the first rotation-type vibration-proof shaft to be integrated with the first rotation-type vibration-proof shaft; and a second rotation-type vibration-proof shaft having one end coupled to the other end of the vibration-proof spring to be integrated with the vibration-proof spring and having the other end fixed to the second vibration-proof ball joint.

The vibration-proof hanger according to the present disclosure may further include a mount fixed to an end of the tilting arm unit opposite to the fitting bracket by a hinge.

The mount may include either a bent bracket fixed to the end of the tilting arm unit or a planar bracket fixed to the end of the tilting arm unit.

The vibration-proof hanger according to the present disclosure may further include a vibration reduction unit integrally provided with at least one of the fitting bracket and the tilting arm unit, thus reducing a cross-sectional area through which vibration is transferred.

The vibration reduction unit may include a slit-shaped groove formed in the shape of a groove in the above-described component to reduce a cross-sectional area.

According to the present disclosure, the vibration-proof hanger may stably and efficiently support a mounted object such as a camera or a measuring instrument while absorbing vibration and, more specifically, may maximally suppress and mitigate vibration transferred to the fitting bracket or the tilting arm unit.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
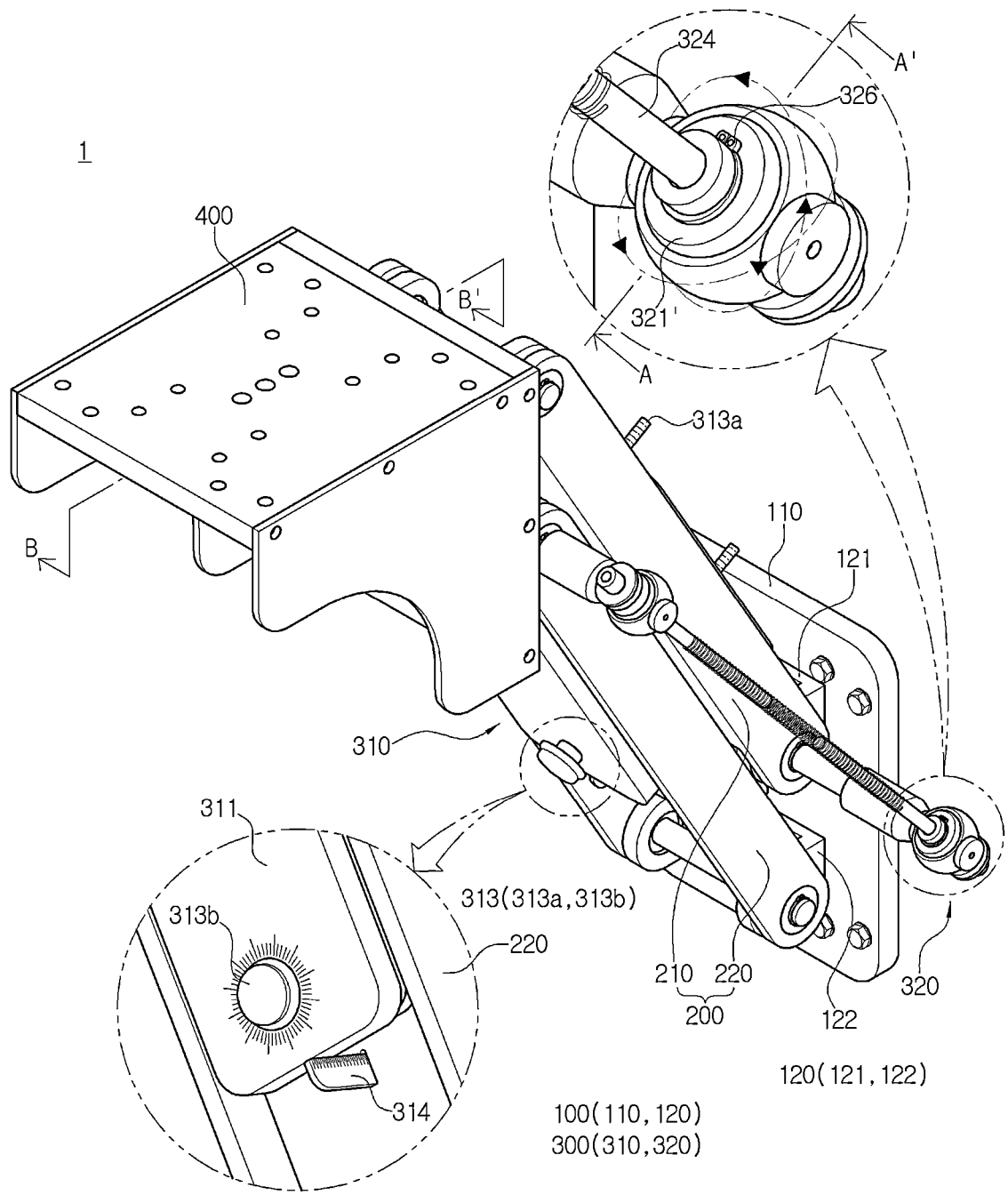
FIG. 1 is a perspective view of a vibration-proof hanger according to a first embodiment of the present disclosure.
Figure 2:
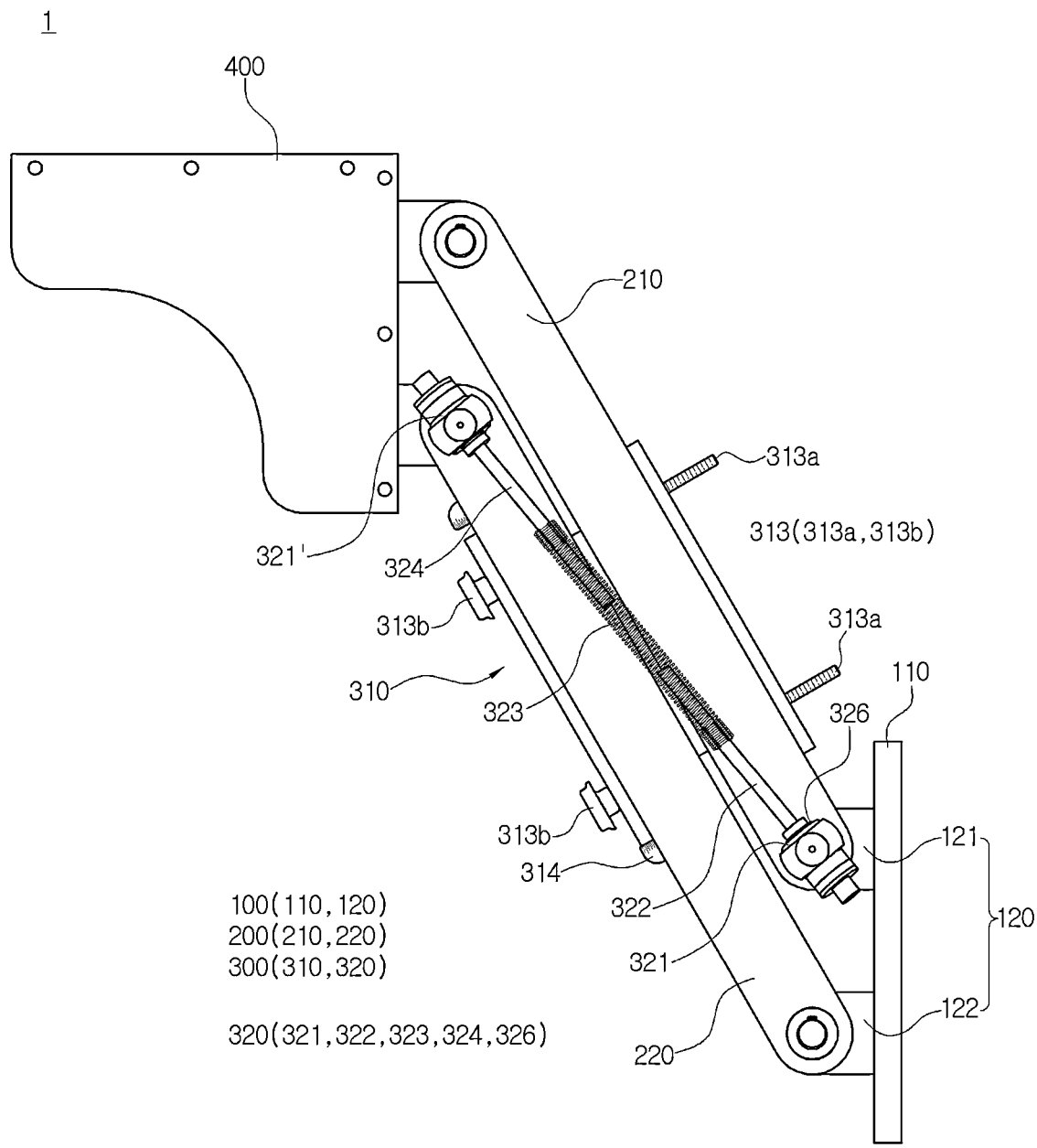
FIG. 2 is a side view of the vibration-proof hanger of FIG. 1.

Hereinafter, the vibration-proof hanger according to an embodiment of the present disclosure will be described with reference to the accompanying drawings. For reference, the same reference numerals in each drawing mean the same member.

As illustrated in FIGS. 1 to 5, the vibration-proof hanger 1 according to the present embodiment may include a fitting bracket 100, a tilting arm unit 200, a vibration-proof unit 300, and a mount 400.

The fitting bracket 100 according to the present embodiment may include a fixed plate 110 that is formed in a plate shape to allow a first surface thereof to be integrally fixed to an artificial structure such as a wall, a column, a support that can be mounted on a transportation means by a plurality of anchor bolts 110. However, the scope of the present disclosure is not limited to the fixed plate 110 allowing the first surface to be fixed to the artificial structure by the plurality of anchor bolts and the fixed plate 110 allows the first surface to be fixed to the artificial structure by various fasteners in addition to the anchor bolt.

Moreover, a hinge unit 120 is provided on a second surface of the fixed plate 110.

In addition, the hinge unit 120 may include an upper hinge 121 provided on the upper part of the tilting arm unit 200 side of the fixed plate 110 and a lower hinge 122 provided on a lower hinge 122 provided on the lower part of the tilting arm unit 200 side of the fixed plate 110.

The tilting arm unit 200 may include an upper arm 210 allowing one end part to be rotatably fixed to the hinge unit 120 to be tilted and allowing one end part to be rotatably fixed to the upper hinge 121 of the fitting bracket 100 to be titled and a lower arm 220 allowing one end part to be rotatably fixed to the lower hinge 122 of the fitting bracket 100 to be tilted together with the upper arm 210.

The tilting arm unit 200 provides a rotational force required for the rotation of tilting to at least one of the upper arm 210 and the lower arm 220 to adjust the tilting angle of the upper arm 210 or the lower arm 220. That is, the tilting angle (inclination angle) is adjusted while the upper arm 210 or the lower arm 220 is rotated by the tilting arm unit 200.

In other words, one end (lower end) of the upper arm 210 is rotatably fixed to the upper hinge 121 of the fitting bracket 100 and the upper arm 210 is rotatably fixed to the top hinge of the other end (top) of the mount 400. Accordingly, the upper arm 210 can be tilted as both ends are rotatably fixed. That is, the upper arm 210 is tilted with respect to at least one of the upper hinge 121 of the fitting bracket 100 and the top hinge of the mount 400.

The lower arm 220 is installed parallel to the lower portion of the upper arm 210. As illustrated, the lower arm 220 allows one end part (lower end) to be rotatably fixed to the lower hinge 122 of the fitting bracket 100. The lower arm 220 is rotatably fixed to the bottom hinge of the other end part (upper end) of the mount 400. Accordingly, the lower arm 220 can be tilted. That is, like the upper arm 210 described above, the lower arm 220 is tilted with respect to at least one of the lower hinge 122 of the fitting bracket 100 and the bottom hinge of the mount 400. At this time, as illustrated, both ends of the lower arm 220 are rotatably fixed to the fitting bracket 100 and the mount 400 together with the upper arm 210.

Figure 3:
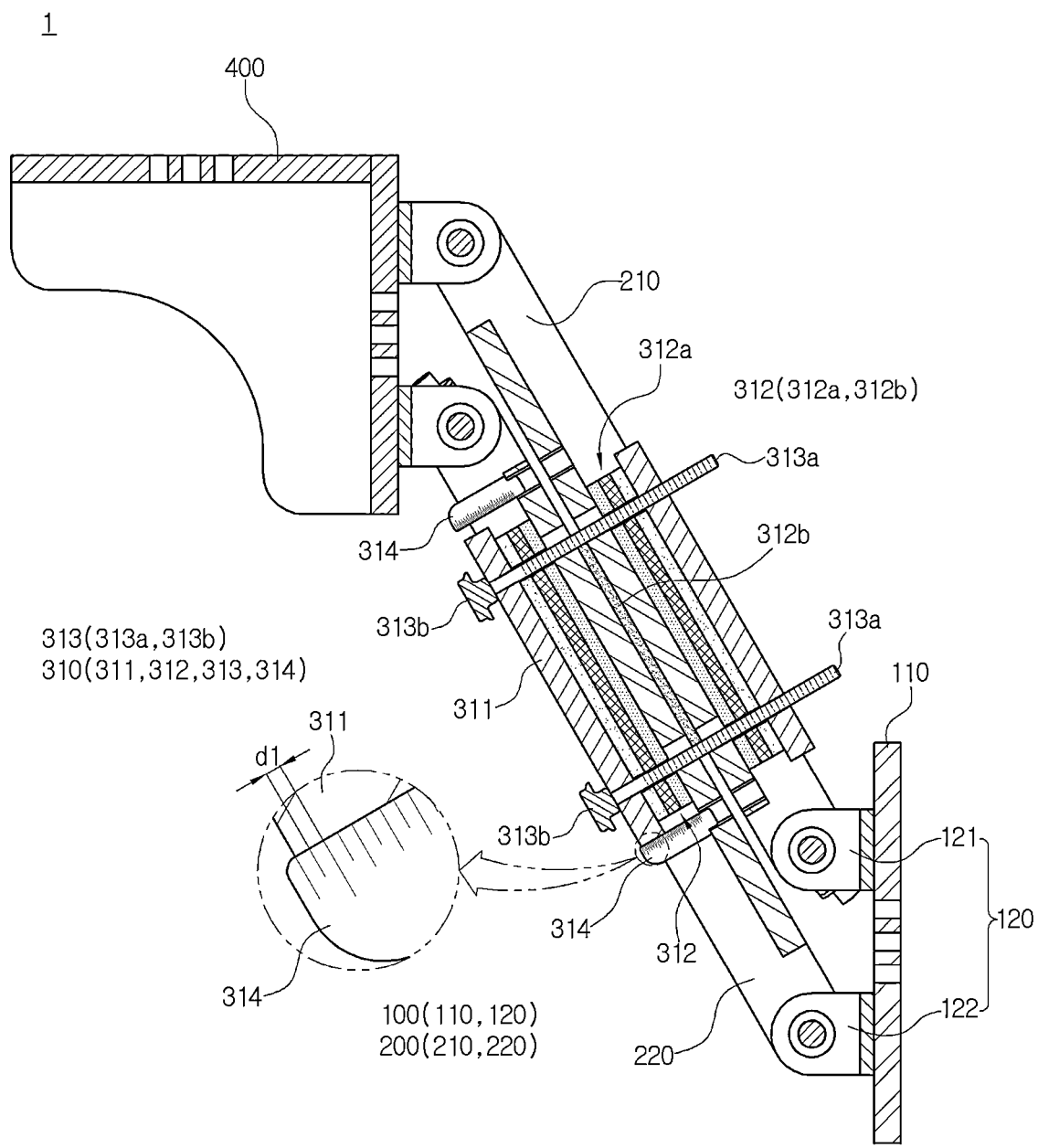
FIG. 3 is a side cross-sectional view B-B' of the vibration-proof hanger of FIG. 1.

The mount 400 allows, for example, a vibration-sensitive object, such as a camera CA, a measuring instrument, and the like, to be detachably mounted thereon integrally. The mount 400 is configured as a bent bracket having a cross section approximately like 'L' as illustrated in FIGS. 1 and 3 so that the above-described object is detachably mounted on the other side. As illustrated, the mount 400 has the top hinge and the bottom hinge, to which the other ends of the upper arm 210 and the lower arm 220 are rotatably fixed, respectively, provided integrally on the upper part and the lower part of one side thereof. The mount 400 may be configured to allow the object to be mounted on the upper part thereof, but alternatively may be configured to be mounted on the lower part thereof. In addition, the mount 400 may be rotated with respect to the top hinge and/or the bottom hinge as illustrated in FIGS. 15A to 15D to be described later.

The vibration-proof unit 300 is coupled to the tilting arm unit 200 to absorb the vibration transferred to the tilting arm unit 200 or be rotated, thereby preventing the vibration from occurring in the tilting arm unit 200. The vibration-proof unit 300 may include at least one of a absorption-type vibration-proof module 310 coupled to the central portion of the tilting arm unit 200 in the longitudinal direction of the tilting arm unit 200 to absorb the vibration of the tilting arm unit 200 or a rotation-type vibration-proof module 320 coupled to the tilting arm unit 200 and configured to be rotatable.

The absorption-type vibration-proof module 310 may include an absorption-type vibration-proof module body 311, a vibration-proofing elastic member 312, and a coupling dial 313.

As illustrated, the vibration-proof module body 311 includes planar plates to be installed while being exposed to the outside of each of the lower arm 220 and the upper arm 210, allows grid lines to be described later to be marked thereon, and allows a dial cap 313b to be described later to be installed therein.

The vibration-proof elastic member 312 is provided with a plurality of layers disposed inside the absorption-type vibration-proof module body 311, wherein each layer is made of a different material, and is coupled in the longitudinal direction of the tilting arm unit 200 to elastically support the tilting arm unit 200. That is, the vibration-proof elastic member 312 according to the present embodiment includes a first elastic member 312a forming a plurality of layers inside the absorption-type vibration-proof module body 311, and additionally includes a second elastic member 312b provided between the upper arm 210 and the lower arm 220. The second elastic member 312b is provided between the upper arm 210 and the lower arm 220 to absorb and reduce vibration that may be generated when the upper arm 210 and the lower arm 220 are interlocked. Accordingly, the vibration-proof elastic member 312 buffers the vibration to prevent the mounted object from being vibrated.

The coupling dial 313 is coupled through the absorption type vibration-proof module body 311, the vibration-proof elastic member 312, and the tilting arm unit 200. For this coupling structure, the coupling dial 313 is configured to allow a rotary dial cap 313b to be described later to move along a dial shaft 313a to be described later. Such a coupling dial 313 may adjust the thickness of the vibration-proof elastic member 312 by movement of the dial cap 313b. Accordingly, the coupling dial 313 may adjust the vibration absorption amount of the vibration-proof elastic member 312 by varying the thickness of the vibration-proof elastic member 312.

The coupling dial 313 according to the present embodiment may be dual-type coupling dials 313 that are provided in a dual manner to allow each coupling dial 313 to be faced in the center line intersecting the longitudinal direction of the absorption-type vibration-proof module body 311. Each coupling dial 313 includes a dial shaft 313a and a dial cap 313b.

The dial cap 313b is coupled to one end of the dial shaft 313a and has a scale marked in the circumferential direction of one side or the outer circumferential surface thereof to check the number of rotations. The scale may include, for example, a second scale in which a scale having a smaller unit or a denser interval d2 than the interval d1 of the above-described first scale is marked.

According to the present embodiment, the ratio of the interval d1 of the first scale and the interval d2 of the second scale is 1:1/60 but may be 1:1/2 to 1/100 if necessary. Accordingly, the coupling dial 313 may easily determine the thickness of the vibration-proof elastic member 312 by the manipulation of the dial cap 313b.

Moreover, as illustrated, the dial shaft 313a passes through the absorption-type vibration-proof module body 311, the vibration-proof elastic member 312, and the tilting arm unit 200. Since the dial shaft 313a moves up and down in the axial direction thereof when the dial cap 313b is rotated, the thickness of the vibration-proof elastic member 312 may be easily adjusted by the dial cap 313b. Accordingly, the vibration absorption amount of the vibration-proof elastic member 312 is easily adjusted.

In the embodiment of the present disclosure as described above, the vibration-proof elastic member 312 whose vibration absorption amount is adjusted by the dial cap 313b absorbs and buffers vibration. Accordingly, the embodiment of the present disclosure absorbs the vibration transferred to the above-described object installed on the mount 400 or prevents the vibration from occurring.

On the other hand, the absorption-type vibration-proof module 310 according to the present embodiment may further coupling thickness display plates 314 configured to be adjacent to or spaced apart from both sides of the absorption-type vibration-proof module body 311 and having the first scale indicating the thickness of the vibration-proof elastic member 312.

In other words, the two coupling thickness display plates 314 according to the present embodiment are coupled to the upper arm 210 or the lower arm 220 to be spaced apart from the absorption-type vibration-proof module body 311. As such, in the embodiment of the present disclosure, the absorption-type vibration-proof module body 311 may be disposed between the two coupling thickness display plates 314, and the coupling thickness display plates 314 may be disposed between the absorption-type vibration-proof module body if necessary to be adjacent to or spaced apart from the absorption-type vibration-proof module body 311 to form a space in which the vibration-proof module body 311 can move.

On the other hand, the rotation-type vibration-proof modules 320 according to the present embodiment are provided in a dual manner on both sides to be faced with each other with respect to the tilting arm unit 200, thereby increasing stability. As illustrated in detail in FIG. 5, such a dual-type rotation-type vibration-proof module 320 is coupled with the vibration-proof spring 323 to form a trapezoid when viewed from the upper or lower surface of the vibration-proof hanger 1 according to the present embodiment, thereby providing effects of rolling left and right, and absorbing the vibration transferred to the above-described mounted object of the vibration-proof hanger 1 or preventing the same from occurring.

In addition, each of the rotation-type vibration-proof modules 320 may include: a first vibration-proof ball joint 321 including a first ball joint penetration part 321a coupled to one end of the fixed plate 110 side of any one selected from the upper arm 210 and the lower arm 220; a vibration-proof rod configured to be disposed to cross the longitudinal direction of the upper arm 210 and the lower arm 220 while allowing one end thereof to be connected to such a first vibration-proof ball joint 321; a second vibration-proof ball joint 321' including a second ball joint penetration part 321'a while being connected to the other end of such a vibration-proof rod; an auxiliary spring extension bracket 328 coupled to the first vibration-proof ball joint 321 and the second vibration-proof ball joint 321; and a snap ring 326 fixing the auxiliary spring extension bracket 328.

Figure 4:
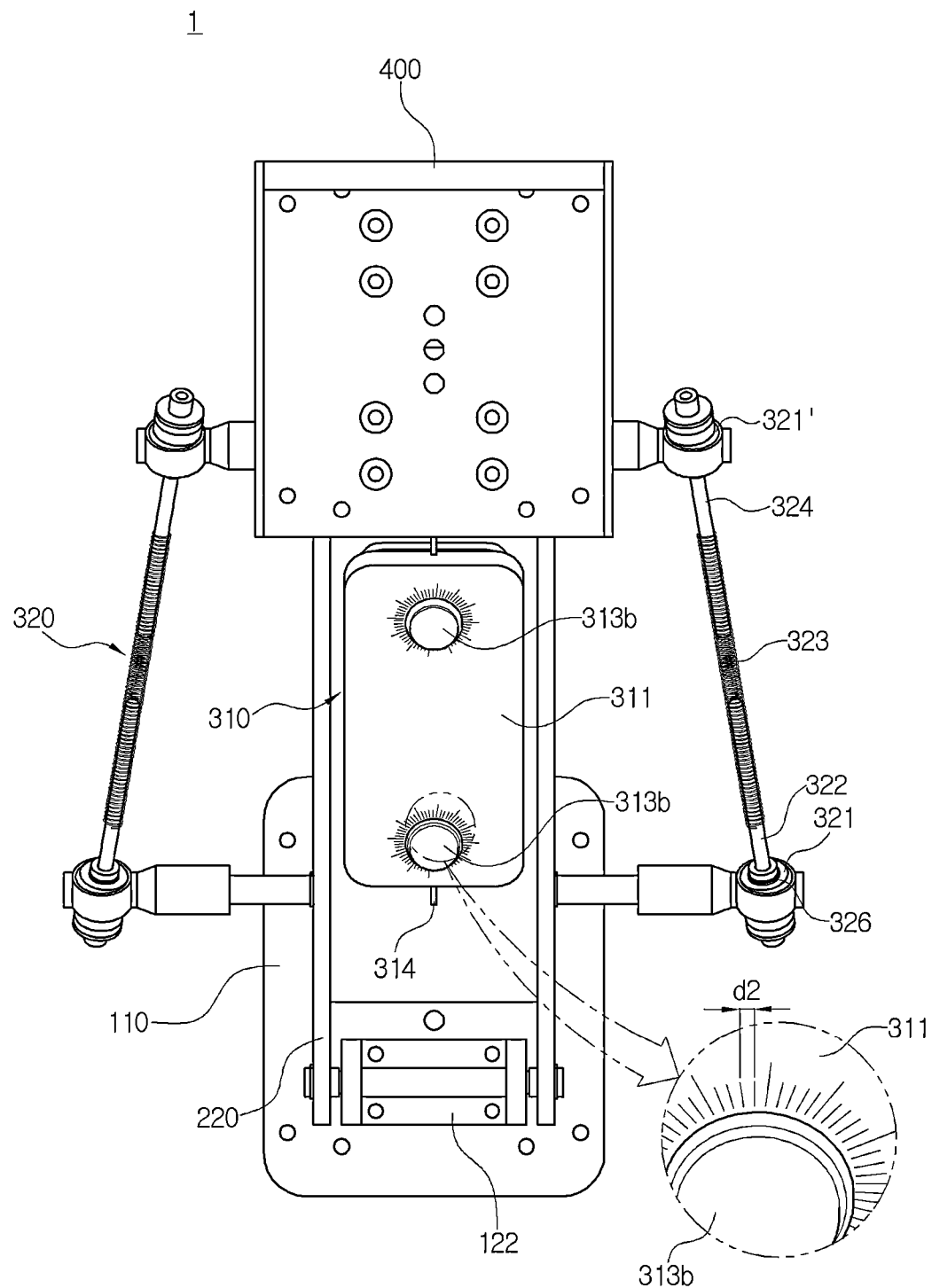
FIG. 4 is a rear view of the vibration-proof hanger of FIG. 1.
Figure 5:
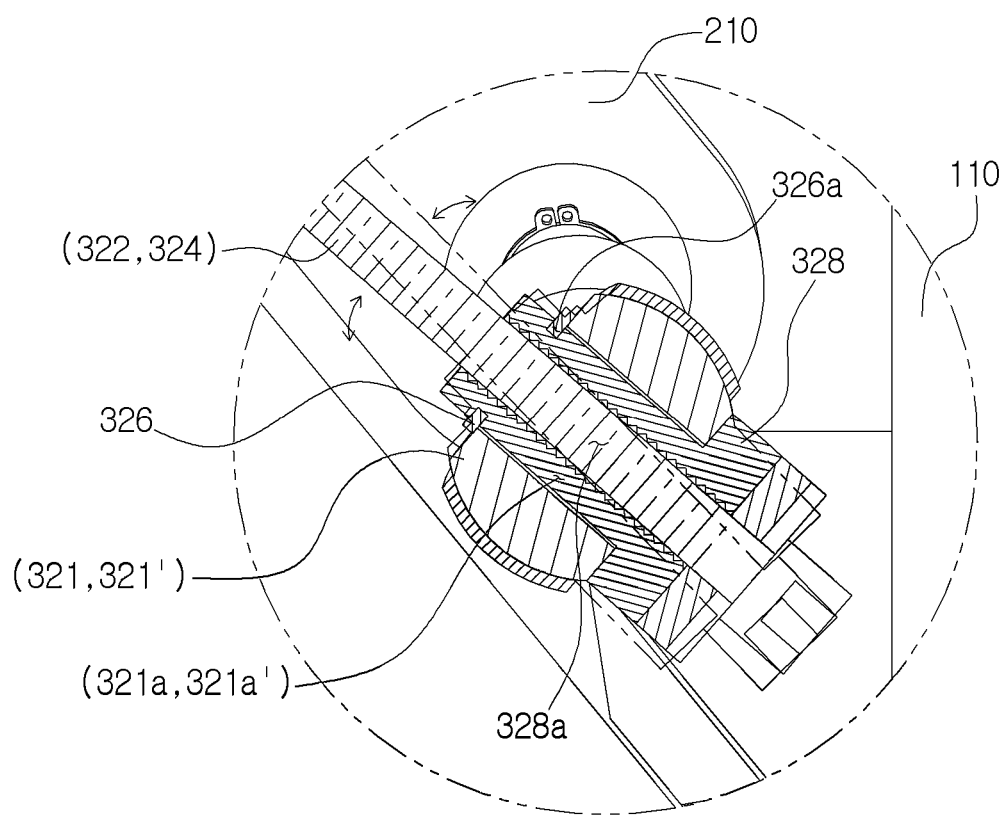
FIG. 5 is a side cross-sectional view A-A' of a rotation-type vibration-proof module of FIG. 1.
Figure 6:
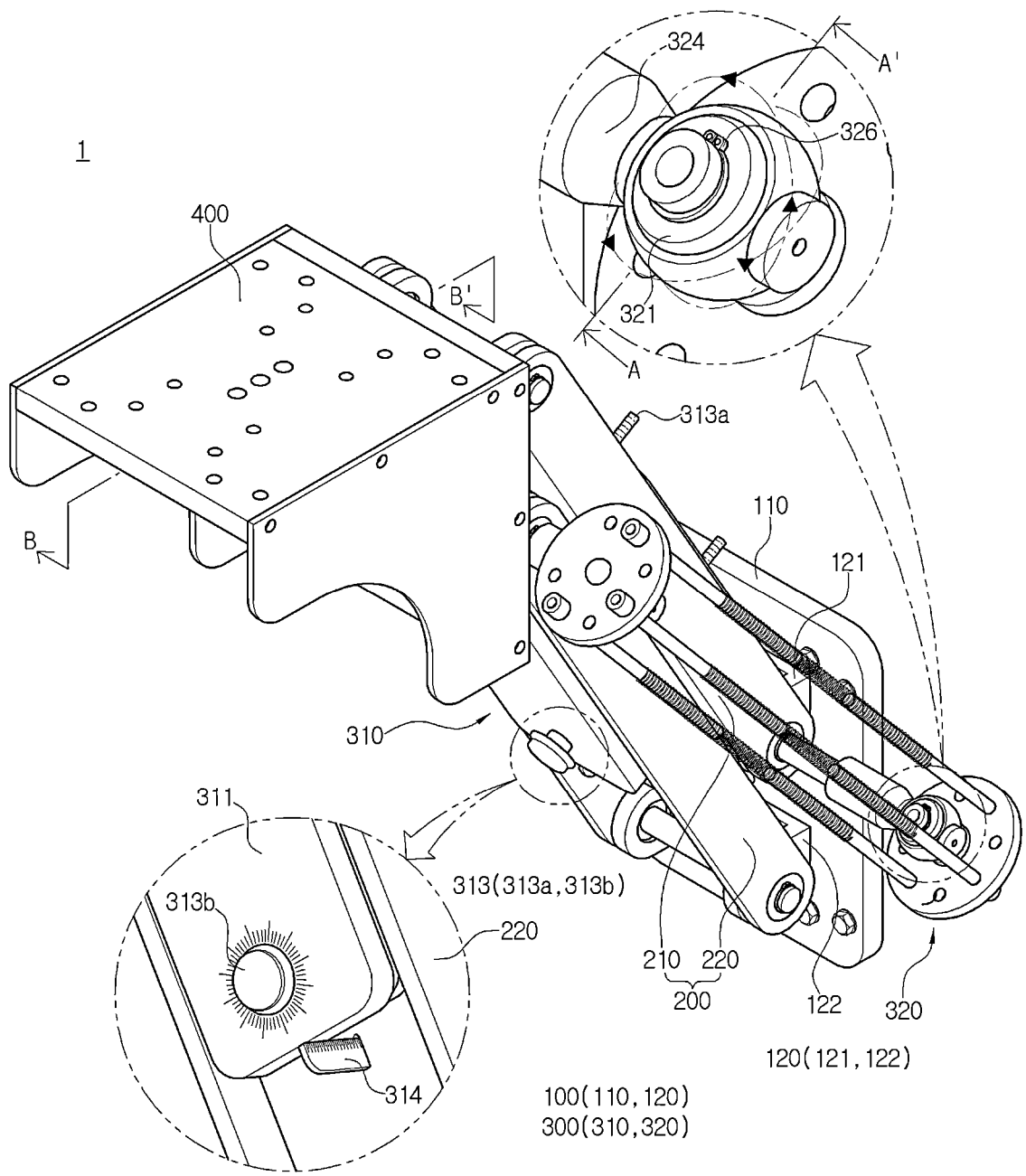
FIG. 6 is a perspective view of a vibration-proof hanger according to a second embodiment of the present disclosure.
Figure 7:
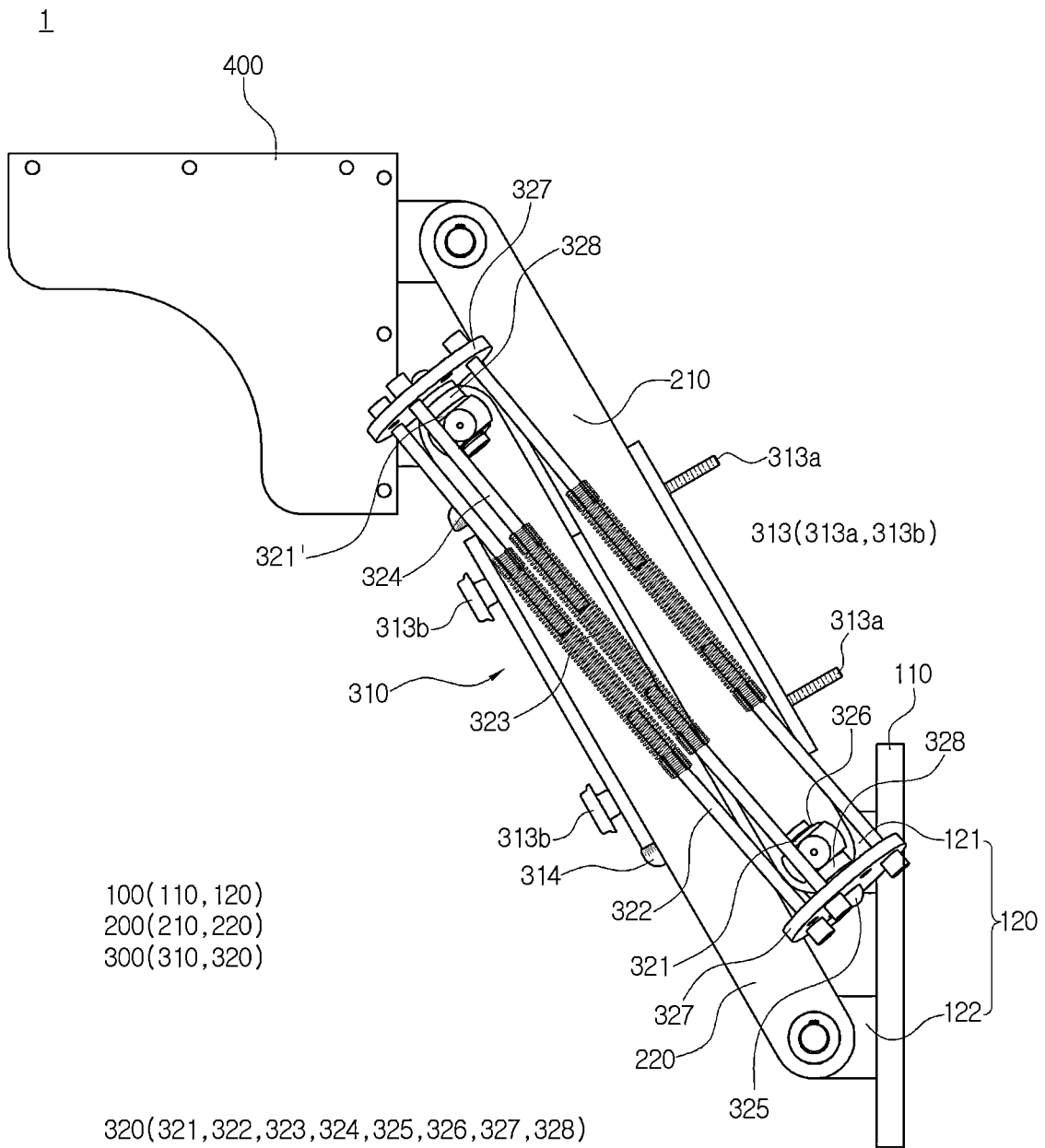
FIG. 7 is a side view of the vibration-proof hanger of FIG. 6.
Figure 8:
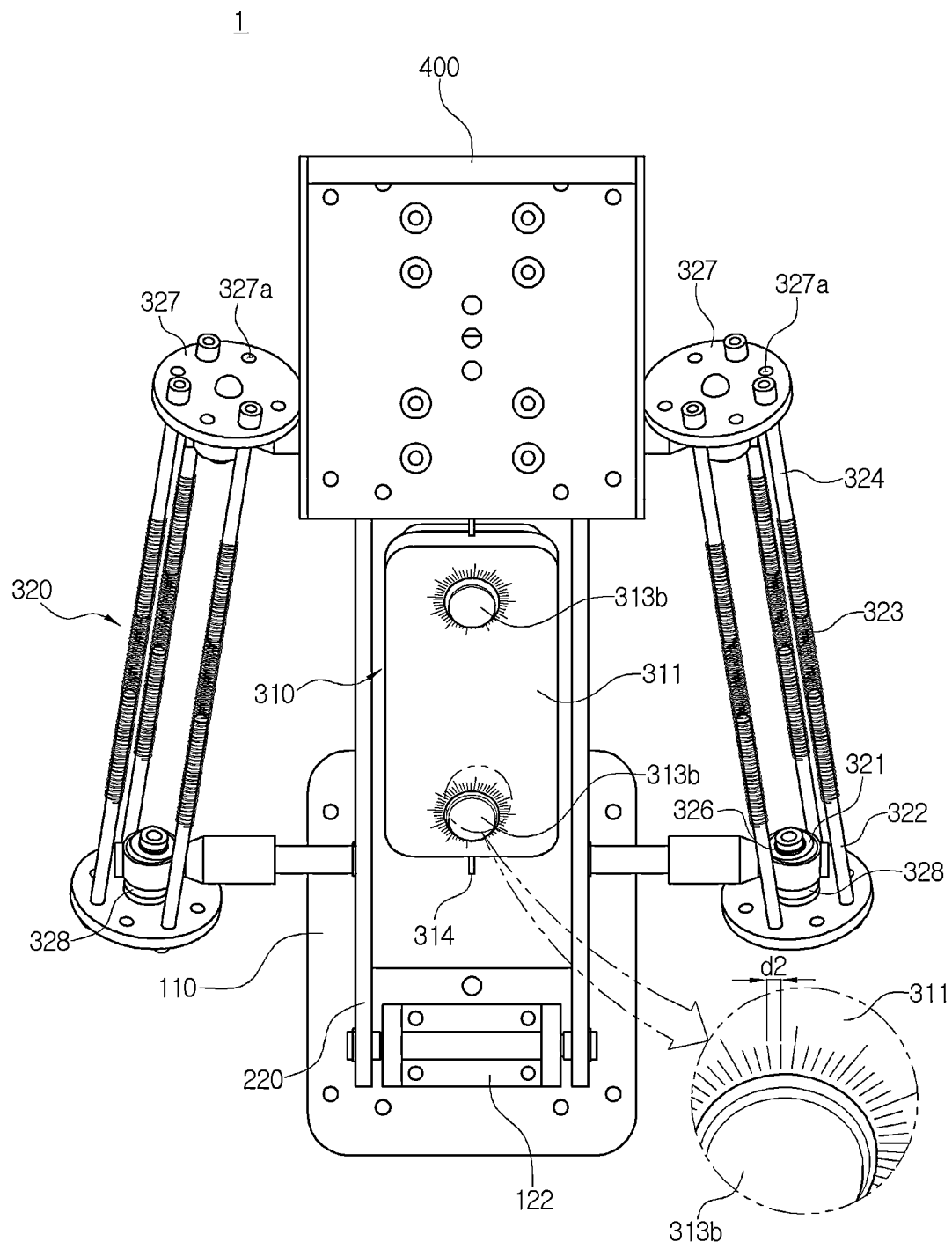
FIG. 8 is a rear view of the vibration-proof hanger of FIG. 6.
Figure 9:
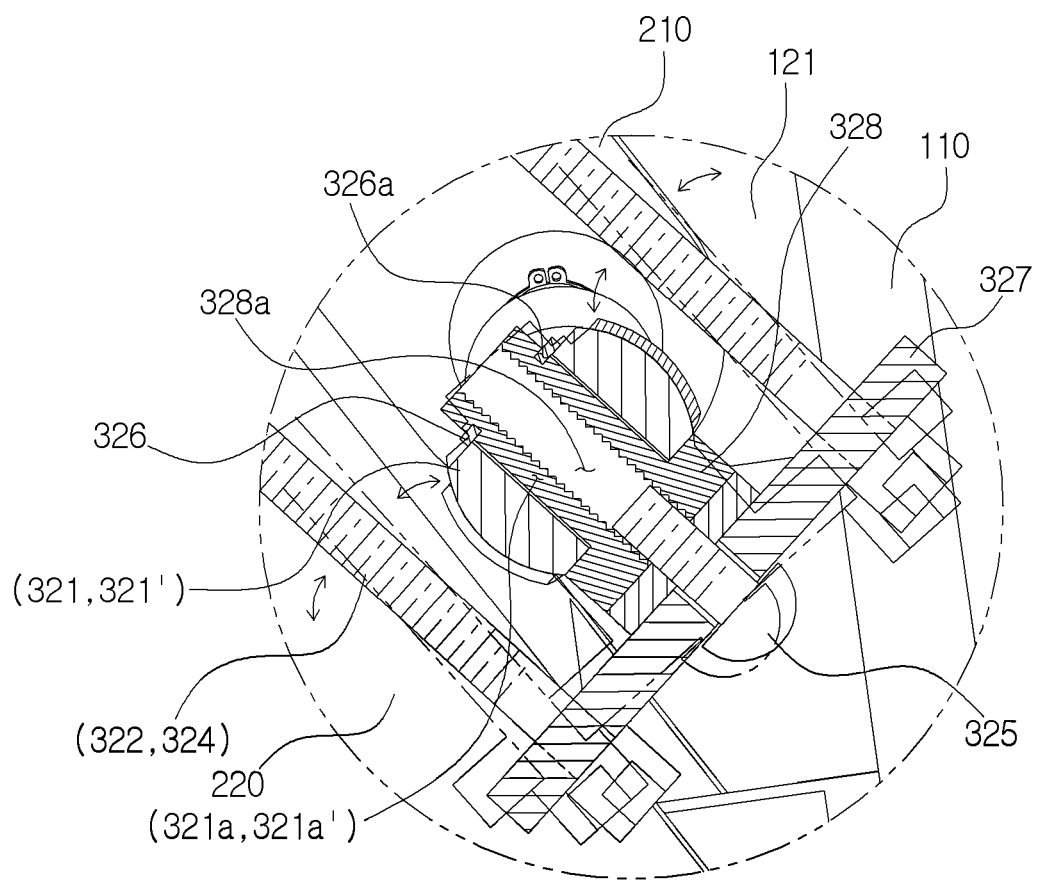
FIG. 9 is an enlarged cross-sectional view of the rotation-type vibration-proof module of FIG. 6.
Figure 10:
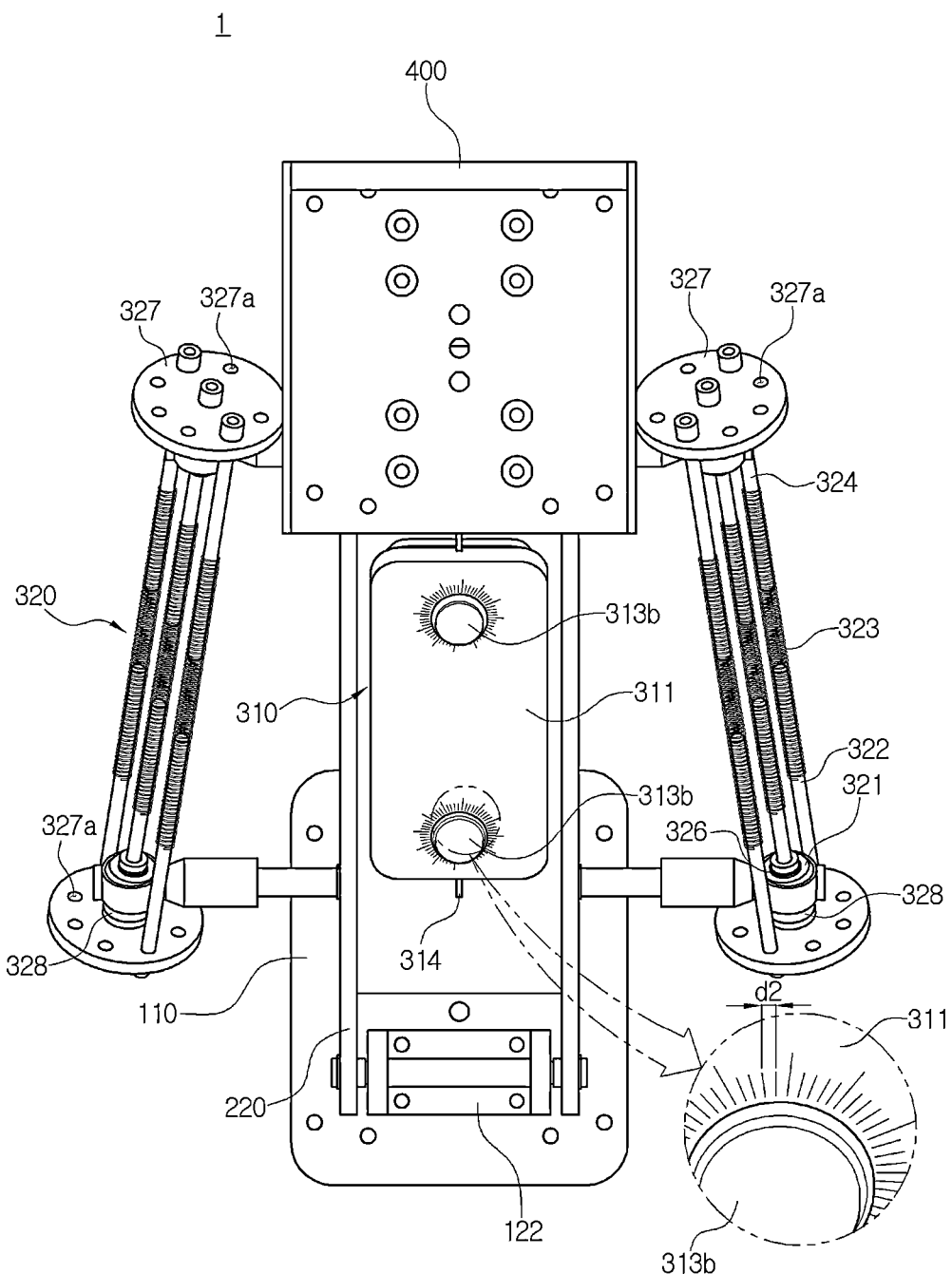
FIG. 10 is a perspective view of a vibration-proof hanger according to a third embodiment of the present disclosure.
Figure 11:
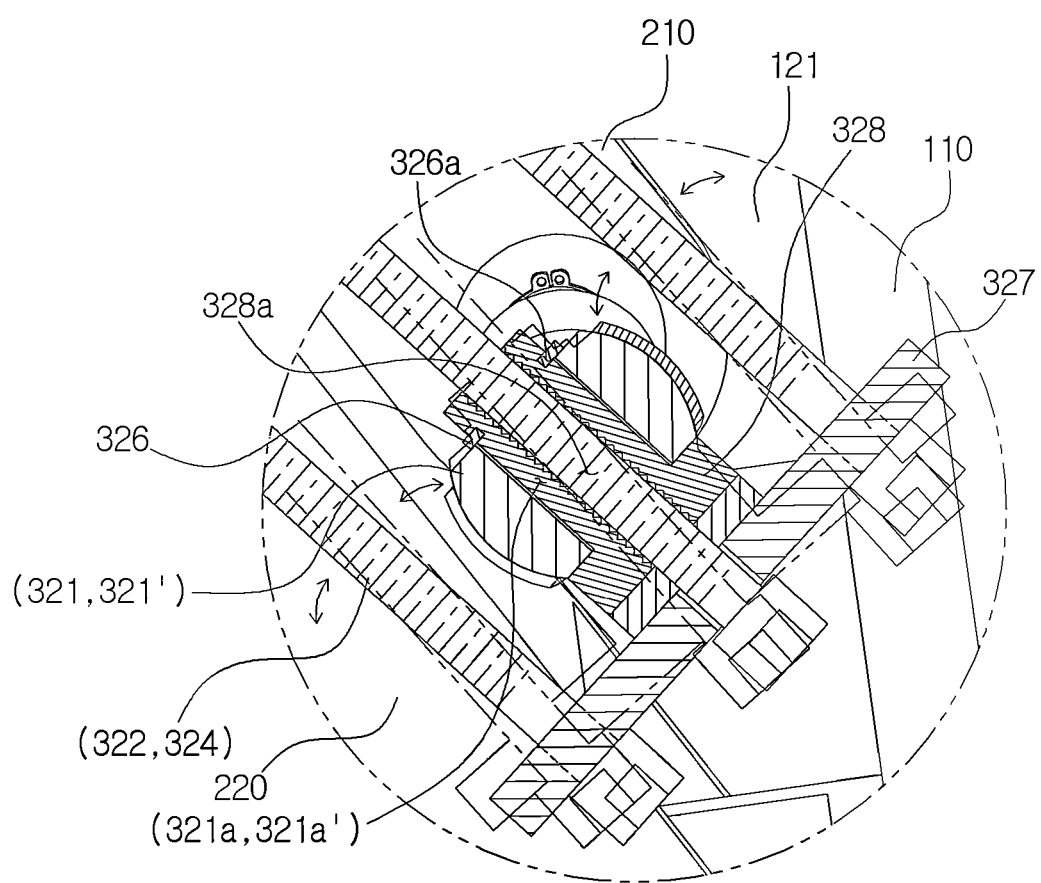
FIG. 11 is an enlarged cross-sectional view of the rotation-type vibration-proof module of FIG. 10.
Figure 12:
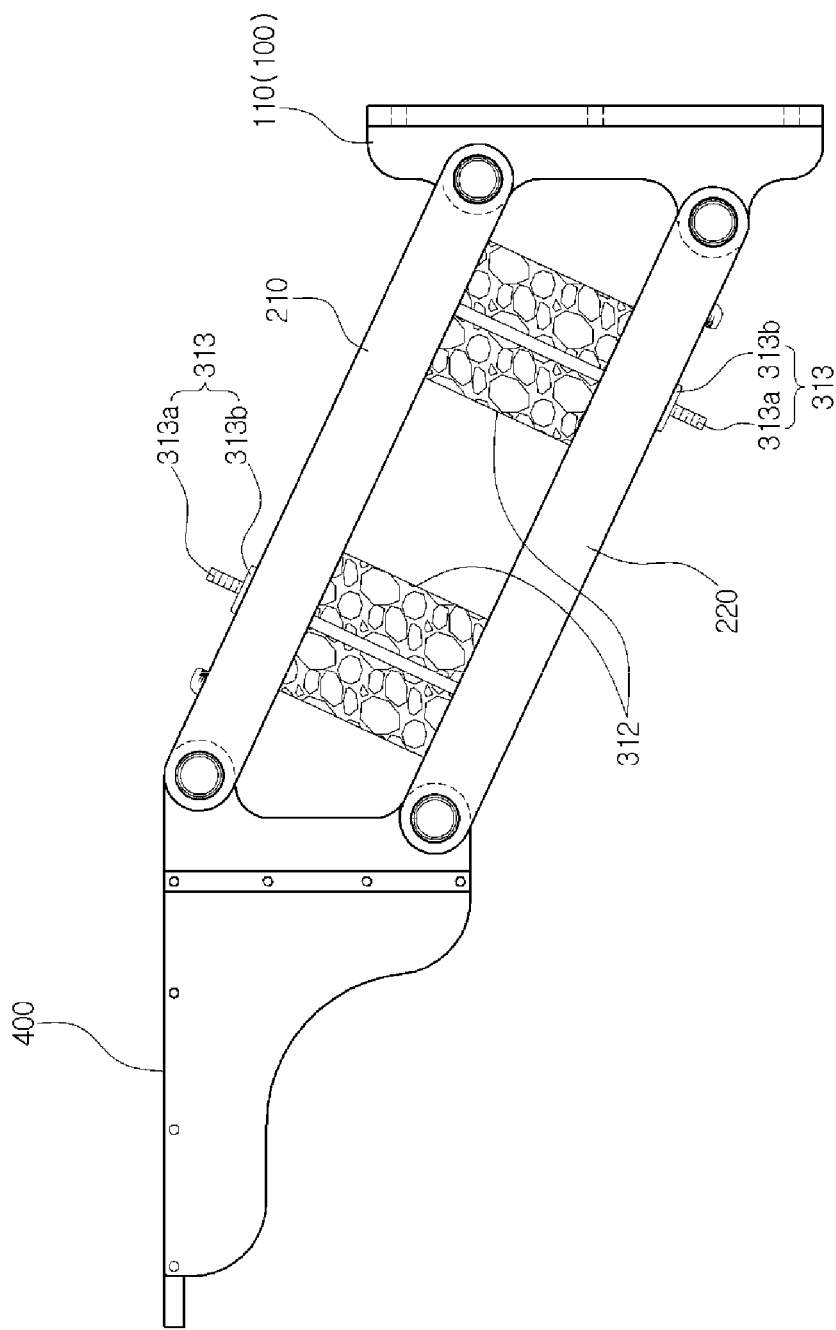
FIG. 12 is a side view of a vibration-proof hanger according to a fourth embodiment of the present disclosure.
Figure 13:
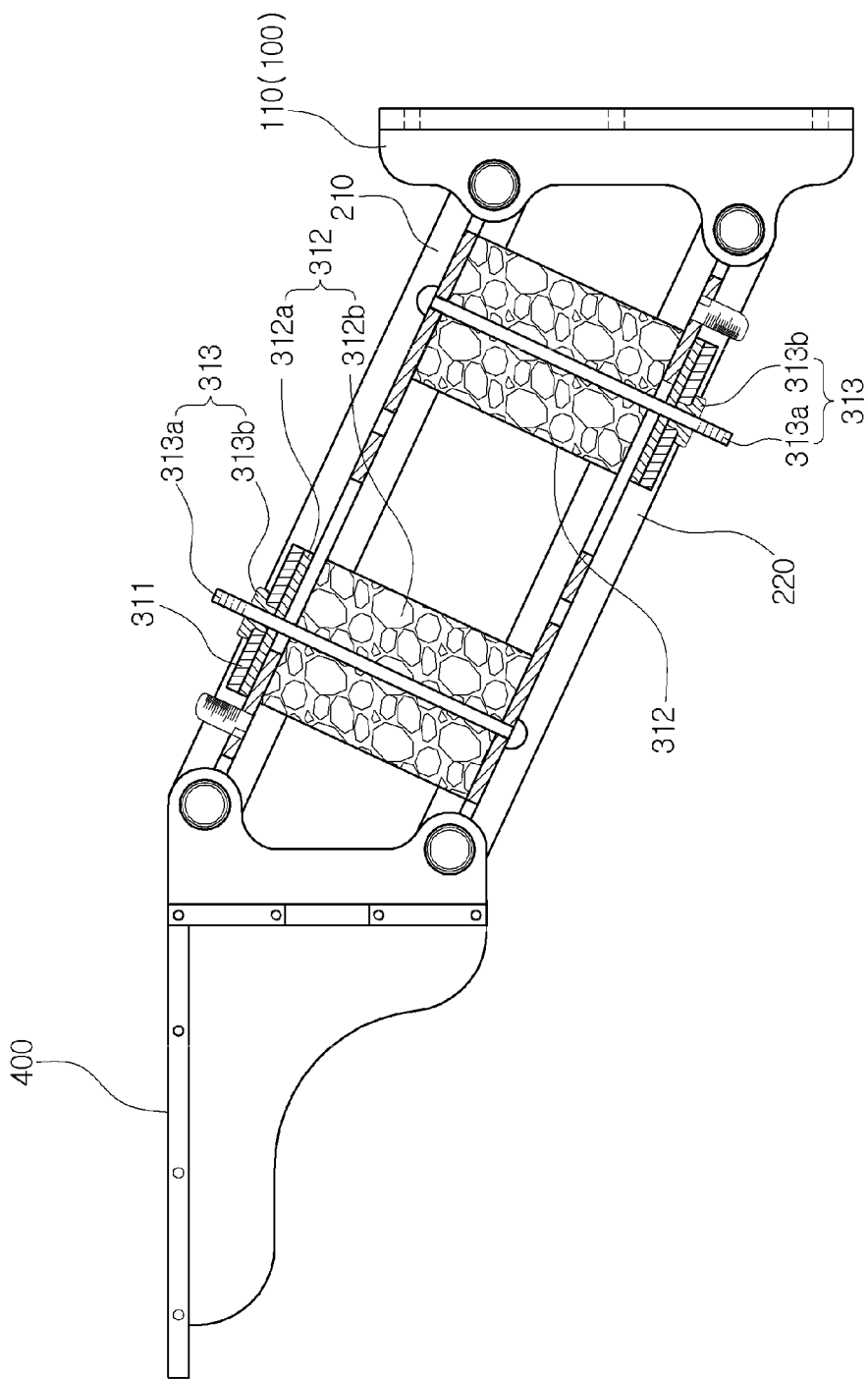
FIG. 13 is a side cross-sectional view of the vibration-proof hanger illustrated in FIG. 12.
Figure 14:
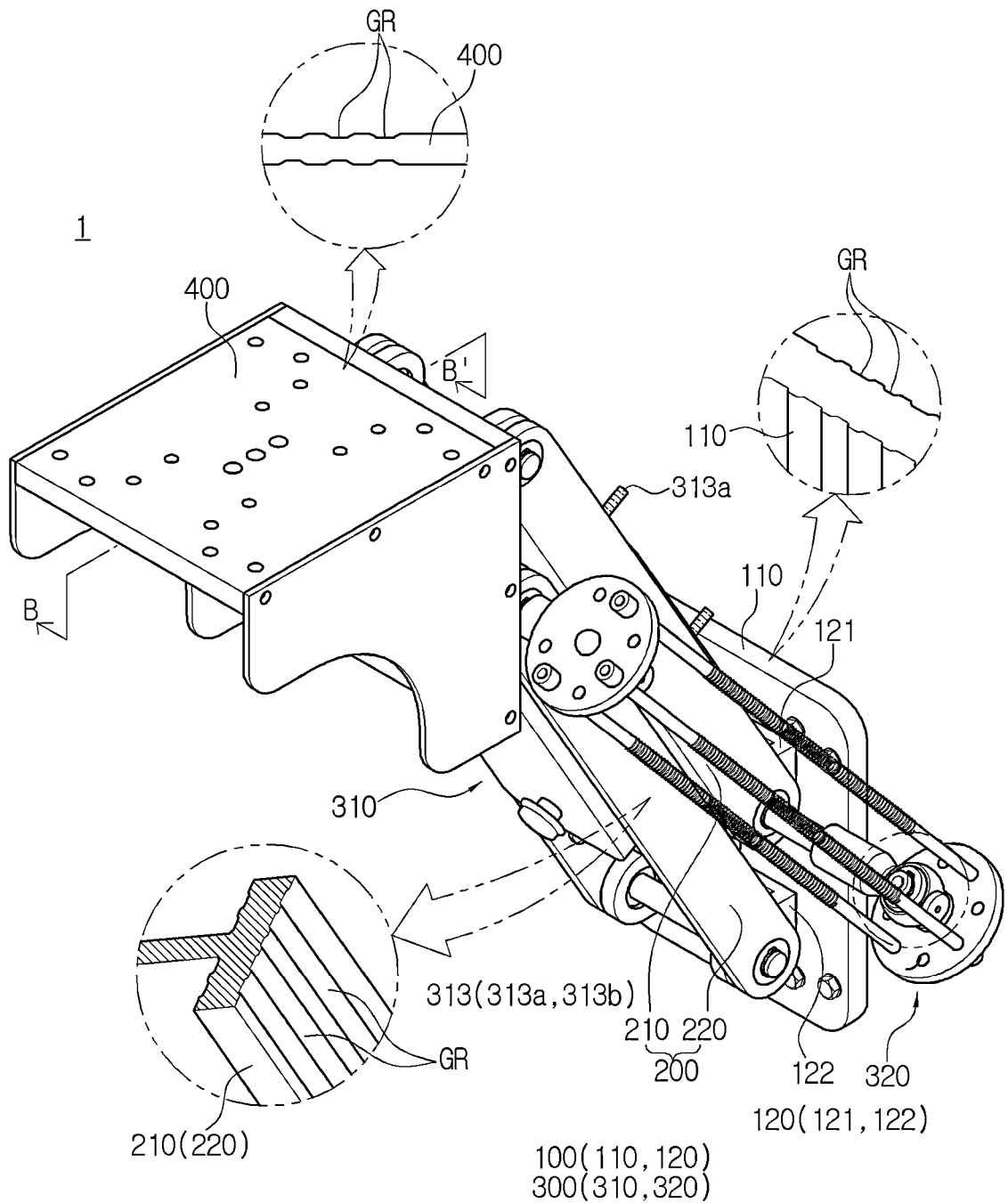
FIG. 14 is a perspective view illustrating an enlarged view of a vibration reduction unit according to an embodiment of the present disclosure.
Figure 15A:
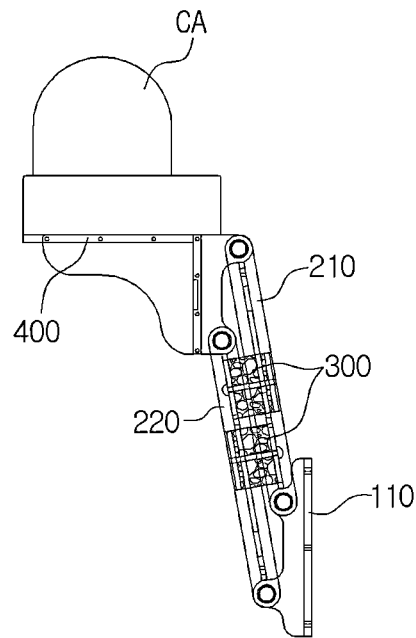
FIGS. 15A to 15D are side views illustrating the use state of the vibration-proof hanger according to an embodiment of the present disclosure.
Figure 15B:
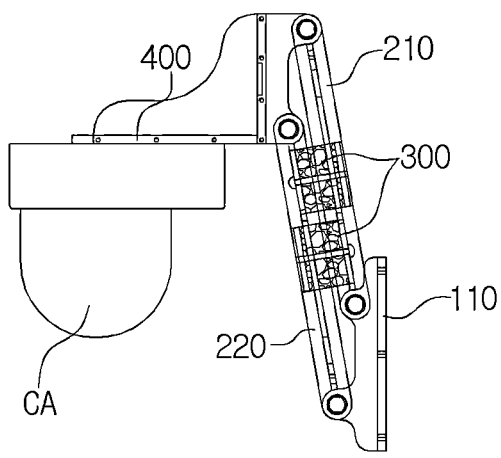
Figure 15C:
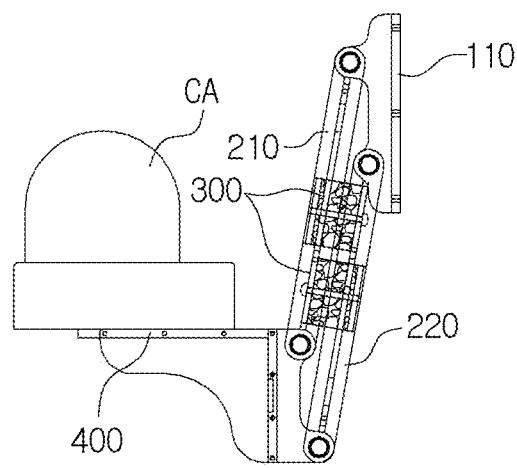
Figure 15D:
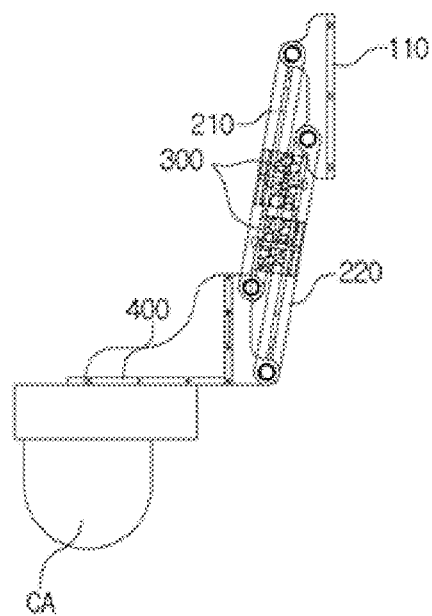
Figure 16A:
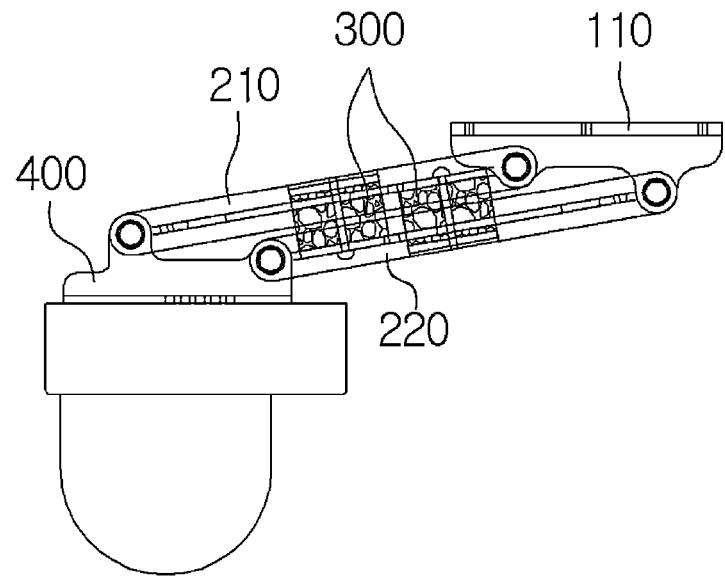
FIGS. 16A and 16B are schematic side views of a vibration-proof hanger according to a fifth embodiment of the present disclosure.
Figure 16B:
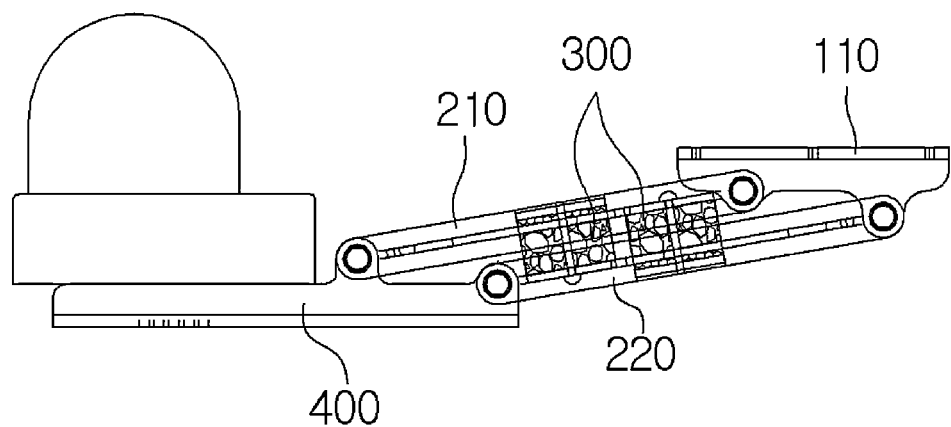
Figure 17A:
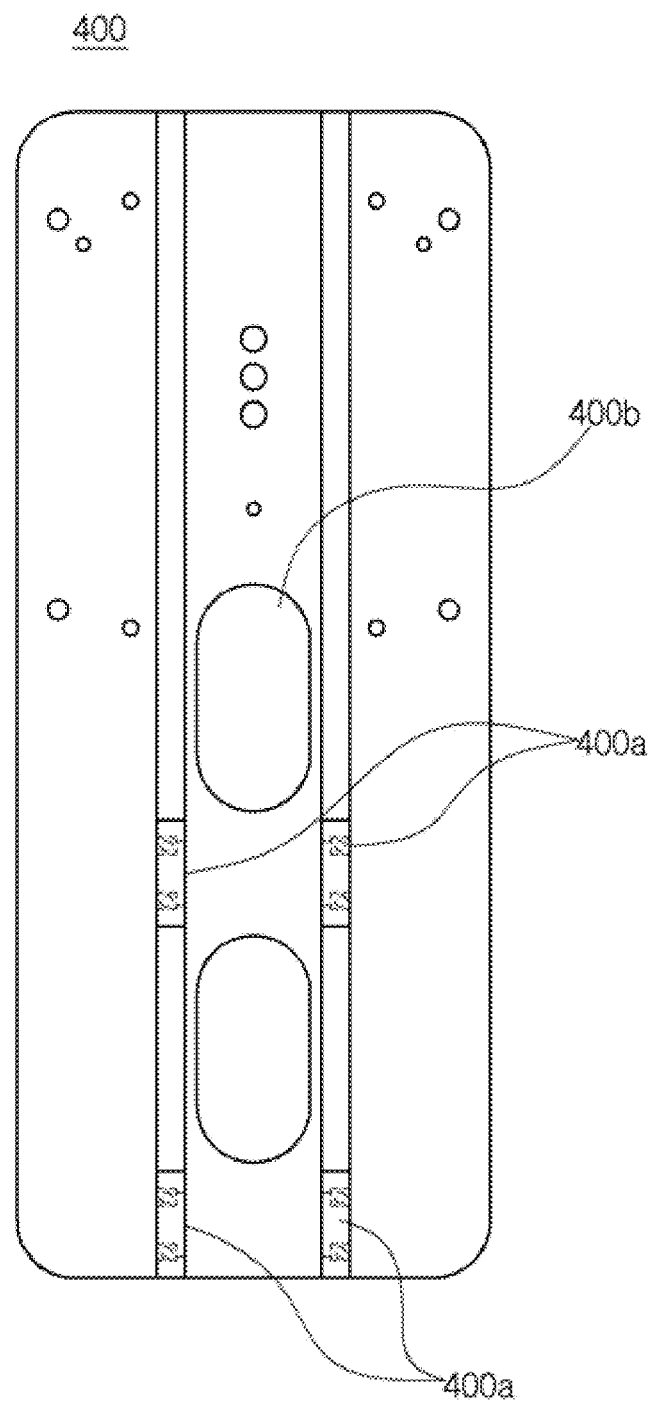
FIGS. 17A and 17B are views illustrating another embodiment of a mount illustrated in FIGS. 16A and 16B.
Figure 17B:
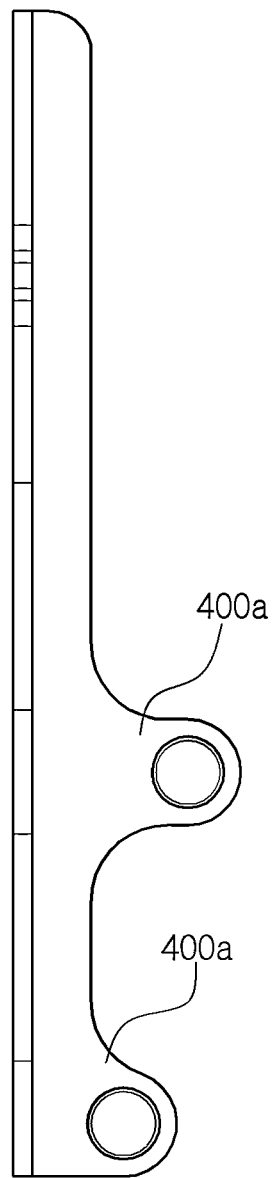
Figure 18A:
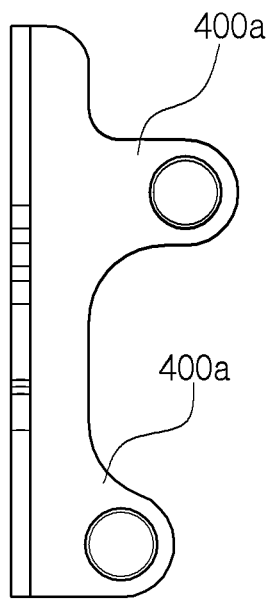
FIGS. 18A to 18C are views illustrating another embodiment of the mount illustrated in FIGS. 16A and 16B.
Figure 18B:
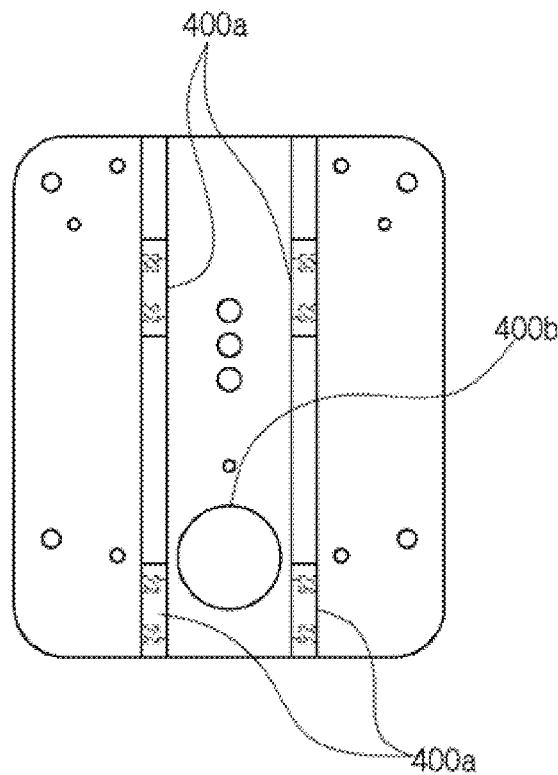
Figure 18C:
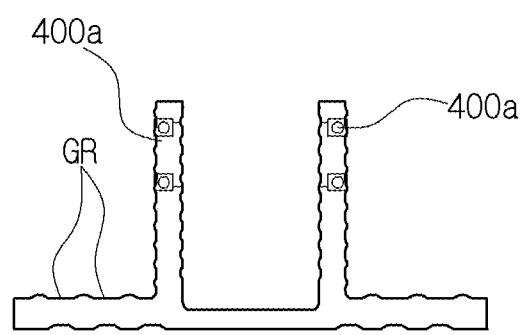
Figure 19:
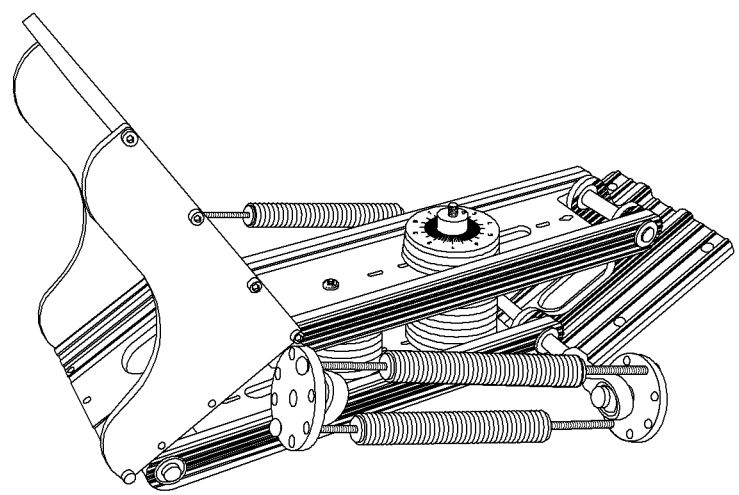
FIG. 19 is a front perspective view illustrating a photograph of the vibration-proof hanger illustrated in FIGS. 16A and 16B.
Figure 20:
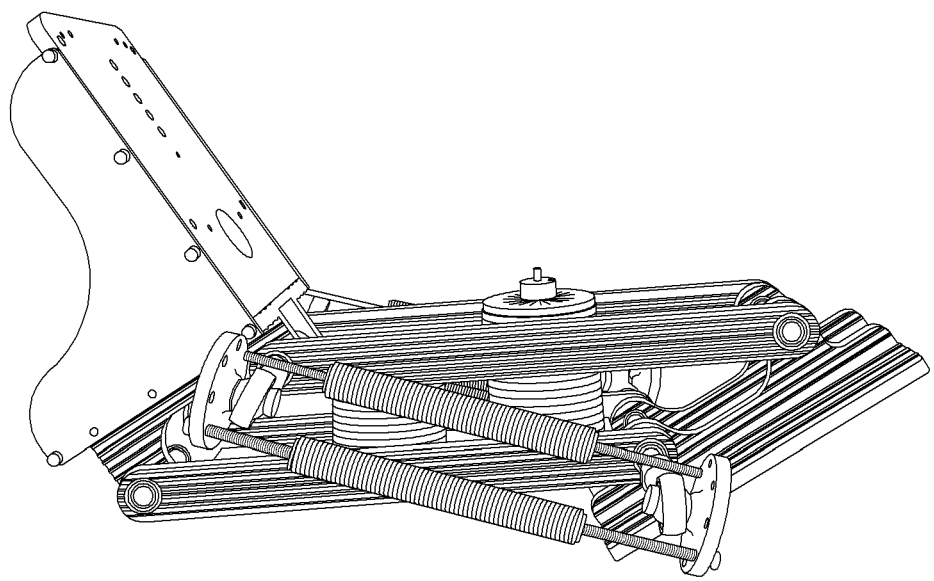
FIG. 20 is a side view illustrating the vibration-proof hanger illustrated in FIGS. 16A and 16B as a photograph.
Figure 21:
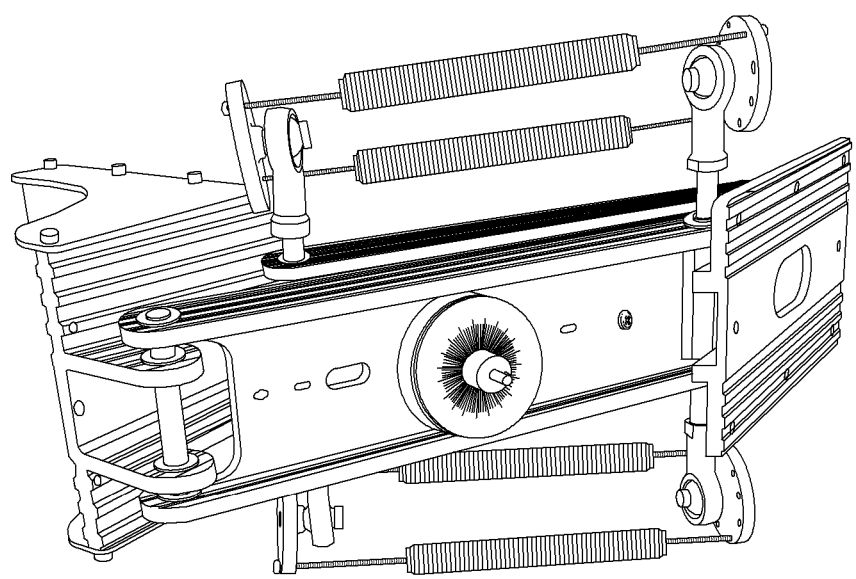
FIG. 21 is a bottom perspective view of the vibration-proof hanger illustrated in FIGS. 16A and 16B as a photograph.

Here, as illustrated in FIGS. 4 and 5, the above-described vibration-proof rod may be configured to include, for example, a first rotation-type vibration-proof shaft 322, a vibration-proof spring 323, and a second rotation-type vibration-proof shaft 324. As illustrated, the first rotation-type vibration-proof shaft 322 allows one end to be integrally connected to the above-described first vibration-proof ball joint 321 through the auxiliary spring extension bracket 328. As illustrated, the vibration-proof spring 323 is formed of a coil spring to allow one end toe be coupled to the first rotation-type vibration-proof shaft 322. As illustrated, the second rotation-type vibration-proof shaft 324 is connected to one end of the vibration-proof spring 323 while forming a line and allows the other end part thereof to be integrally connected to the second vibration-proof ball joint 321' through the auxiliary spring extension bracket 328.

When vibration occurs, as illustrated in FIG. 5, the vibration-proof rod moves around the first vibration-proof ball joint 321 or the second vibration-proof ball joint 321'. At this time, the vibration-proof rod moves smoothly as the vibration-proof spring 323 deforms. Moreover, the vibration-proof rod buffers the vibration through the self-elastic force of the vibration-proof spring 323. Accordingly, the vibration-proof rod reduces the vibration through bending deformation or expansion/contraction of the vibration-proof spring 323.

The snap ring 326 is detachably coupled to a snap ring coupling groove 326a formed at one end of the auxiliary spring extension bracket 328 to prevent the auxiliary spring extension bracket 328 from being separated from the first ball joint penetration part 321a or the second ball joint penetration part 321a'.

The auxiliary spring extension bracket 328 is coupled to the first rotation-type vibration-proof shaft 322 and/or the second rotation-type vibration-proof shaft 324 of the above-described vibration-proof rod to stably support the first rotation-type vibration-proof shaft 322 or the second rotation-type vibration-proof shaft 324.

On the other hand, other embodiments of the present disclosure shown in FIGS. 6 to 11 are different from the above-described embodiments in that a plurality of above-described vibration-proof rods is included and a spring extension bracket 327 is included.

As illustrated, the embodiments of the present disclosure may be configured to include a spring extension bracket 327 in each of the rotation-type vibration-proof module 320 and may be implemented by removing the spring extension bracket 327 as in the above-described embodiment. For convenience of description, only the spring extension bracket 327 will be described below.

The spring extension bracket 327 is provided with a plurality of vibration-proof shaft coupling holes 327a to which the plurality of above-described vibration-proof rods are coupled respectively. In other words, the spring extension bracket 327 is fixed by inserting the first rotation-type vibration-proof shaft 322 and the second rotation-type vibration-proof shaft 324, which form both ends of the plurality of vibration-proof rods, into the vibration-proof shaft coupling hole 327a.

As such, the spring extension bracket 327 allows the number of vibration-proof rods to be adjusted according to user convenience to efficiently absorb and prevent the vibration that may be transferred to the above-described mounted object. That is, in another embodiment of the present disclosure, as illustrated in FIGS. 4 and 5, a plurality of above-described vibration-proof rods may be configured as needed. The number of such vibration-proof rods may be determined according to the amount of vibration to be absorbed.

In the embodiment of the present disclosure as described above, as illustrated in FIGS. 8 and 9, as the spring extension bracket 327 rolls around the first vibration-proof ball joint 321 or the second vibration-proof ball joint 321', the above-described vibration-proof rod absorbs the vibration while moving in a torsional manner. At this time, the vibration-proof rod moves smoothly as the vibration-proof spring 323 deforms. The vibration-proof rod buffers the vibration by the self-elastic force of the vibration-proof spring 323. Accordingly, the vibration-proof rod reduces the vibration through bending deformation or expansion/contraction of the vibration-proof spring 323.

According to the present embodiment having the structure and action as described above, the mounted object may be stably and efficiently supported while the vibration is absorbed, and in particular, the vibration transferred to the fitting bracket or the tilting arm unit may be suppressed and mitigated as much as possible.

On the other hand, as illustrated in FIGS. 12 to 13 and 19 to 21, the above-described coupling dial 313 allows any one of dial caps 313*b* to be mounted on one end part (one side) of any one of a pair of spaced dial shafts 313*a* by screw coupling. As illustrated, the coupling dial 313 allows the other dial cap 313*b* to be mounted on the other end part (opposite side) of the remaining dial shaft 313*a* by screw coupling. That is, since the pair of dial caps 311*b* are respectively mounted on opposite ends of the dial shafts 313*a* as illustrated, they face each other at opposite positions.

As each of the dial caps 313*b* is mounted as described above, when being individually operated, each of the dial caps 313*b* moves along the dial shaft 313*a* at the opposite positions and presses the absorption-type vibration-proof module body 311 to shrink the vibration-proof elastic member 312. At this time, the dial caps 313*b* respectively press the absorption-type vibration-proof module body 311 in opposite directions. Accordingly, only the portion adjacent to the operated dial cap 313*b* of the vibration-proof elastic member 312 is shrunk and deformed to a thickness suitable for vibration absorption. That is, the thickness of the vibration-proof elastic member 312 is adjusted by the dial cap 313*b*.

Here, the above-described absorption type vibration-proof module body 311 may be formed of a substantially rectangular plate through which a plurality of dial shafts 313*a* pass together as illustrated in FIGS. 1 and 3 but may be alternatively formed of a plate through which only one of the dial shafts 313*a* passes as illustrated in FIGS. 12 to 13 and 19 to 21. As illustrated, the absorption-type vibration-proof module bodies 311 are respectively installed on the upper arm 210 and the lower arm 220 of the tilting arm unit 200 in an opposite state together with the dial cap 313*b*.

When the absorption-type vibration-proof module body 311 is configured as described above, each vibration-proof module body 311 presses the respective vibration-proof elastic members 312 while being pressed by the opposite respective dial caps 313*b*, thereby adjusting the thickness of the vibration-proof elastic member 312. Accordingly, such absorption-type vibration-proof module bodies 311 prevent the pressing force transferred when one of the dial caps 313*b* is operated from being transferred to the other dial cap 313*b*.

For example, since the vibration-proof module body 311 of FIGS. 1 and 3 described above is formed of a single plate to allow a plurality of dial caps 313*b* to be installed therein while being spaced apart, the pressing force by any one of the dial caps 313*b* is transferred to the vibration-proof elastic member 312 in which the remaining dial cap 313*b* is disposed. Accordingly, the above-described vibration-proof module body 311 cannot precisely adjust the thickness of the vibration-proof elastic member 312. However, as described above, when the vibration-proof module body 311 is configured to be installed in an opposite state, it is possible to prevent the pressing force transferred from one vibration-proof module body 311 from being transferred to the remaining vibration-proof module body 311, and thus the thickness of the vibration-proof elastic member 312 may be precisely adjusted to a desired thickness.

On the other hand, the above-described vibration-proof elastic member 312 may be divided as illustrated in FIGS. 12 to 13 and 19 to 21 to be configured in plurality. As illustrated, the vibration-proof elastic member 312 is configured by being divided into a number corresponding to the number of the dial shaft 313*a* or the dial caps 313*b*. As illustrated, each of the divided vibration-proof elastic members 312 allows the pair of dial shafts 313*a* to be passed therethrough. Since the divided vibration-proof elastic members 312 are physically separated as illustrated, the pressing force by the dial cap 313*b* does not interfere with each other even when the dial cap 313*b* coupled to each dial shaft 313*a* is operated. Accordingly, the thickness of each of the divided vibration-proof elastic members 312 is precisely adjusted.

On the other hand, the above-described mount 400 installed on the tilting arm unit 200 may be configured as a bent bracket as illustrated in FIGS. 1 and 3 but may be differently configured as a planar bracket shown in FIGS. 16A to 18C. As illustrated, the planar bracket may be formed of, for example, a substantially rectangular or square plate. As illustrated, the mount 400 is provided with a yoke 4000*a* to which a hinge is coupled in a penetrating state and a bearing may be mounted inside the yoke 400*a*. In conclusion, as illustrated in FIGS. 15A to 16B, the mount 400 may be configured as the above-described planar or bent bracket according to the characteristics of the object mounted on one side surface thereof.

Here, in at least one of the tilting arm unit 200, the mount 400, and the fitting bracket 100 described above, a vibration reduction unit may be integrally provided to reduce vibration. That is, the vibration reduction unit may be integrally provided in the upper arm 210 and the lower arm 220 of the tilting arm unit 200, the bent or planar bracket of the mount 400, and the fixing plate 110 of the fitting bracket 100.

The vibration reduction unit reduces the cross-sectional area of the above-described component to which the vibration is transferred, thereby reducing the vibration transferred to the above-described component. For example, as illustrated in the enlarged view of FIG. 14 and FIGS. 19 to 21, the vibration reduction unit may be configured as a slit-shaped groove that is formed in the shape of a groove in the above-described component by extrusion to reduce the cross-sectional area of the above-described component. Since the cross-sectional area of the portion where the slit-shaped groove GR is formed is reduced in the above-described component, the vibration is not transferred to the portion where the slit-shaped groove GR is formed. Accordingly, the slit-shaped groove GR reduces the vibration transferred through the above-described component.

When the slit-shaped groove GR is not prepared in the above-described component, the above-described component is thickened so that the vibration is completely transferred. However, when the slit-shaped groove GR is prepared in the above-described component, there is no medium for transferring the vibration to the portion where the slit-shaped groove GR is formed, and thus the vibration does not transfer. Accordingly, the transferred vibration is reduced in the above-described component.

In such a component, even when the slit-shaped groove GR is formed, only the thickness of the portion where the slit-shaped groove GR is formed is reduced, and the thickness of other portions is not reduced, so that the designed strength can be maintained.

The vibration reduction unit may be configured as a through-hole 400*b* as illustrated in FIGS. 17A to 18C. Such a through-hole 400*b* isolates the vibration transferred to the above-described component to reduce the vibration. The through-hole 400b may be provided together with the above-described slit-shaped groove GR to double vibration reduction effect.

In the embodiment of the present disclosure as described above, since the pair of dial caps 313b are installed in each absorption-type vibration-proof module body 311 in opposite states, the pressing force of the dial cap 313b is applied to each vibration-proof module body 311, and the dial cap 313b is exposed even when the fixing plate 110 of the fitting bracket 100 is installed on a structure such as a wall, so that the dial cap 313b can be easily operated.

In addition, since the absorption-type vibration-proof module body 311 is configured in a number corresponding to the number of the dial caps 313b to allow each dial shaft 313a to be installed therein in a penetrating state, it is possible to prevent the pressing force by any one of the dial caps 313b from being transferred to the other dial cap 313b or the elastic member 312.

Moreover, when the vibration-proof elastic member 312 is divided into a plurality of parts, it is possible to prevent the pressing force by the dial cap 313b from being transferred to each of the vibration-proof elastic members 312.

Moreover, when the mount 400 is provided on the tilting arm unit 200, the mounted object such as a camera CA may be easily installed on the mount 400.

In addition, when a groove-shaped vibration reduction unit is provided, it is possible to reduce the vibration transferred to the tilting arm unit 200, the mount 400, and the fitting bracket 100 and, more specifically, when the vibration reduction unit is configured as the slit-shaped groove, it is possible to easily configure the vibration reduction unit.

Although the preferred embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A vibration-proof hanger, comprising:
a fitting bracket having a fixed plate configured to allow a first surface thereof to be integrally fixed to an artificial structure, wherein a hinge unit is provided on a second surface of the fixed plate;
a tilting arm unit configured to allow a first end thereof to be rotatably fixed to the hinge unit to be tilted; and
a vibration-proof unit configured to be coupled to the tilting arm unit to absorb vibration transferred to the tilting arm unit or rotate to prevent the vibration of the tilting arm unit,
wherein the vibration-proof unit comprises at least one of an absorption-type vibration-proof module coupled to a central portion in a longitudinal direction of the tilting arm unit to absorb the vibration of the tilting arm unit and a rotation-type vibration-proof module coupled to the tilting arm unit and provided rotatably, and
wherein the absorption-type vibration-proof module comprises an absorption-type vibration-proof module body, a vibration-proof elastic member provided inside the absorption-type vibration-proof module body and coupled in parallel to the longitudinal direction of the tilting arm unit to elastically support the tilting arm unit, and a coupling dial coupled through the absorption-type vibration-proof module body, the vibration-proof elastic member, and the tilting arm unit to adjust a thickness of the vibration-proof elastic member.

2. The vibration-proof hanger of claim 1, wherein the absorption-type vibration-proof module further comprises a thickness indication plate provided adjacent to or spaced apart from the absorption-type vibration-proof module body and provided with a first scale for indicating the thickness of the vibration-proof elastic member.

3. A vibration-proof hanger, comprising:
a fitting bracket having a fixed plate configured to allow a first surface thereof to be integrally fixed to an artificial structure, wherein a hinge unit is provided on a second surface of the fixed plate;
a tilting arm unit configured to allow a first end thereof to be rotatably fixed to the hinge unit to be tilted; and
a vibration-proof unit configured to be coupled to the tilting arm unit to absorb vibration transferred to the tilting arm unit or rotate to prevent the vibration of the tilting arm unit,
wherein the vibration-proof unit comprises at least one of an absorption-type vibration-proof module coupled to a central portion in a longitudinal direction of the tilting arm unit to absorb the vibration of the tilting arm unit and a rotation-type vibration-proof module coupled to the tilting arm unit and provided rotatably,
wherein the absorption-type vibration-proof module comprises:
an absorption-type vibration-proof module body;
a vibration-proof elastic member provided inside the absorption-type vibration-proof module body and coupled in parallel to the longitudinal direction of the tilting arm unit to elastically support the tilting arm unit;
a coupling dial coupled through the absorption-type vibration-proof module body, the vibration-proof elastic member, and the tilting arm unit to adjust the thickness of the vibration-proof elastic member; and
a thickness indication plate provided adjacent to or spaced apart from the absorption-type vibration-proof module body and provided with a first scale for indicating the thickness of the vibration-proof elastic member, and
wherein the coupling dial comprises:
a dial shaft penetrating the absorption-type vibration-proof module body, the vibration-proof elastic member, and the tilting arm unit; and
a dial cap coupled to an end of the dial shaft and having a second scale that is a scale of a unit less than that of the first scale.

4. The vibration-proof hanger of claim 1, wherein the coupling dial is a dual-type coupling dial provided in a dual manner to face a center line of the absorption-type vibration-proof module body.

5. The vibration-proof hanger of claim 1, wherein the coupling dial comprises:
a dial shaft penetrating the absorption-type vibration-proof module body, the vibration-proof elastic member, and the tilting arm unit; and
a dial cap coupled to an end of the dial shaft and having a scale capable of checking the number of rotations.

6. The vibration-proof hanger of claim 1, wherein the coupling dial comprises:
a plurality of dial shafts penetrating the absorption-type vibration-proof module body, the vibration-proof elastic member, and the tilting arm unit; and
a plurality of dial caps respectively coupled to ends of the dial shafts and each having a scale capable of checking the number of rotations.

7. The vibration-proof hanger of claim 1, wherein the coupling dial comprises:

a plurality of dial shafts penetrating the absorption-type vibration-proof module body, the vibration-proof elastic member, and the tilting arm unit; and a plurality of dial caps respectively coupled to ends of the dial shafts and each having a scale capable of checking the number of rotations, wherein the absorption-type vibration-proof module body is configured in a number corresponding to the number of the dial shafts or the dial caps, and the dial shafts penetrate the absorption-type vibration-proof module bodies, respectively.

8. The vibration-proof hanger of claim 1, wherein the coupling dial comprises:

a plurality of dial shafts penetrating the absorption-type vibration-proof module body, the vibration-proof elastic member, and the tilting arm unit; and a plurality of dial caps respectively coupled to ends of the dial shafts and each having a scale capable of checking the number of rotations, wherein the vibration-proof elastic member is divided into a number corresponding to the number of the dial shafts to allow the dial shafts to penetrate the divided vibration-proof elastic members, respectively.

9. A vibration-proof hanger, comprising:

a fitting bracket having a fixed plate configured to allow a first surface thereof to be integrally fixed to an artificial structure, wherein a hinge unit is provided on a second surface of the fixed plate;

a tilting arm unit configured to allow a first end thereof to be rotatably fixed to the hinge unit to be tilted; and a vibration-proof unit configured to be coupled to the tilting arm unit to absorb vibration transferred to the tilting arm unit or rotate to prevent the vibration of the tilting arm unit, wherein the vibration-proof unit comprises at least one of an absorption-type vibration-proof module coupled to a central portion in a longitudinal direction of the tilting arm unit to absorb the vibration of the tilting arm unit and a rotation-type vibration-proof module coupled to the tilting arm unit and provided rotatably, wherein the rotation-type vibration-proof module is provided in a dual manner to face both sides with respect to the tilting arm unit, and each of the rotation-type vibration-proof modules comprises:

a first vibration-proof ball joint coupled to one end of a fixed plate side of any one selected from an upper arm and a lower arm, and including a first ball joint penetrating portion;

a vibration-proof rod having one end connected to the first vibration-proof ball joint and disposed to cross longitudinal directions of the upper arm and the lower arm; and a second vibration-proof ball joint connected to the other end of the vibration-proof rod, and including a second ball joint penetrating portion.

10. The vibration-proof hanger of claim 9, wherein the vibration-proof rod comprises:

a first rotation-type vibration-proof shaft having one end fixed to the first vibration-proof ball joint;

a vibration-proof spring having one end coupled to the other end of the first rotation-type vibration-proof shaft to be integrated with the first rotation-type vibration-proof shaft; and a second rotation-type vibration-proof shaft having one end coupled to the other end of the vibration-proof spring to be integrated with the vibration-proof spring and having the other end fixed to the second vibration-proof ball joint.

11. The vibration-proof hanger of claim 1, further comprising a vibration reduction unit integrally provided with at least one of the fitting bracket and the tilting arm unit, and configured to reduce a cross-sectional area of the fitting bracket or the tiling arm unit to which vibration is transferred, thus reducing the vibration transferred to the fitting bracket or the tilting arm unit.

12. The vibration-proof hanger of claim 11, wherein the vibration reduction unit comprises a slit-shaped groove formed in a shape of a groove in the fitting bracket or the tilting arm unit to reduce the cross-sectional area of the fitting bracket or the tilting arm unit.

13. The vibration-proof hanger of claim 1, further comprising a mount fixed to an end of the tilting arm unit opposite to the fitting bracket by a hinge.

14. The vibration-proof hanger of claim 13, wherein the mount comprises either a bent bracket fixed to the end of the tilting arm unit or a planar bracket fixed to the end of the tilting arm unit.

15. The vibration-proof hanger of claim 14, wherein the mount further comprises a vibration reduction unit integrally provided with the mount and configured to reduce a cross-sectional area of the mount to reduce vibration transferred to the mount.

16. The vibration-proof hanger of claim 15, wherein the vibration reduction unit comprises a slit-shaped groove formed in the mount to reduce the cross-sectional area of the mount.

* * * * *